United States Patent
Burden

(10) Patent No.: US 11,425,866 B2
(45) Date of Patent: Aug. 30, 2022

(54) AUTOMATED PRUNING OR HARVESTING SYSTEM FOR COMPLEX MORPHOLOGY FOLIAGE

(71) Applicant: Keith Charles Burden, Alamo, CA (US)

(72) Inventor: Keith Charles Burden, Alamo, CA (US)

(*) Notice: Subject to any disclaimer, the term of this patent is extended or adjusted under 35 U.S.C. 154(b) by 36 days.

(21) Appl. No.: 16/271,857

(22) Filed: Feb. 10, 2019

(65) Prior Publication Data
US 2019/0380278 A1 Dec. 19, 2019

Related U.S. Application Data

(63) Continuation-in-part of application No. 15/331,841, filed on Oct. 22, 2016, now abandoned.
(Continued)

(51) Int. Cl.
*A01G 3/08* (2006.01)
*B25J 9/16* (2006.01)
(Continued)

(52) U.S. Cl.
CPC .............. *A01G 3/08* (2013.01); *B25J 9/0045* (2013.01); *B25J 9/1005* (2013.01); *B25J 9/1612* (2013.01); *B25J 9/1679* (2013.01); *B25J 9/1697* (2013.01); *B25J 11/0055* (2013.01); *B25J 15/0019* (2013.01); *B25J 19/0054* (2013.01); *B25J 19/023* (2013.01); *B26D 7/10* (2013.01)

(58) Field of Classification Search
CPC . A01G 3/02; A01G 3/08; A01G 3/067; G06T 7/11; G06T 7/0012; G06T 3/4046; G06T 7/13; G06T 3/4053; G06T 1/20; G06T 1/60; G06T 7/50; G06T 7/0004; G06T 7/0075; G06T 15/04; G06T 7/143; G06T 7/90; G06K 9/4628; G06K 9/00657; G06K 9/6267; G06K 9/6215; G06K 9/00369; G06K 9/00664; G06K 9/38; G06K 9/4652; G06K 9/00234; G05B 19/402; G06N 3/08; G06N 99/005; G06N 3/082
USPC ........................................................ 706/12
See application file for complete search history.

(56) References Cited

U.S. PATENT DOCUMENTS

| | | | | |
|---|---|---|---|---|
| 4,663,925 A | * | 5/1987 | Terada | A01D 46/24 382/153 |
| 2006/0112619 A1 | * | 6/2006 | Oderwald | A01H 4/003 47/1.7 |

(Continued)

*Primary Examiner* — Mouloucoulaye Inoussa
(74) *Attorney, Agent, or Firm* — Integral Patent; Laurence J. Shaw

(57) ABSTRACT

Method and apparatus for automated operations, such as pruning, harvesting, spraying and/or maintenance, on plants, and particularly plants with foliage having features on many length scales or a wide spectrum of length scales, such as female flower buds of the marijuana plant. The invention utilizes a convolutional neural network for image segmentation classification and/or the determination of features. The foliage is imaged stereoscopically to produce a three-dimensional surface image, a first neural network determines regions to be operated on, and a second neural network determines how an operation tool operates on the foliage. For pruning of resinous foliage the cutting tool is heated or cooled to avoid having the resins make the cutting tool inoperable.

9 Claims, 33 Drawing Sheets

Related U.S. Application Data

(60) Provisional application No. 62/250,452, filed on Nov. 3, 2015.

(51) Int. Cl.
  *B25J 11/00* (2006.01)
  *B25J 19/00* (2006.01)
  *B25J 19/02* (2006.01)
  *B26D 7/10* (2006.01)
  *B25J 9/00* (2006.01)
  *B25J 9/10* (2006.01)
  *B25J 15/00* (2006.01)

(56) References Cited

U.S. PATENT DOCUMENTS

| | | | |
|---|---|---|---|
| 2006/0275027 A1* | 12/2006 | Knijff | A23N 15/08 396/190 |
| 2008/0235952 A1* | 10/2008 | Standiform | B26B 27/00 83/16 |
| 2010/0268391 A1* | 10/2010 | Anderson | A01G 25/167 700/284 |
| 2012/0022691 A1* | 1/2012 | Owens, Jr. | B25J 9/1687 700/259 |
| 2013/0311154 A1* | 11/2013 | Atohira | G06T 1/00 703/6 |
| 2014/0184496 A1* | 7/2014 | Gribetz | G02B 27/017 345/156 |
| 2015/0173297 A1* | 6/2015 | Pitzer | A01D 46/30 56/328.1 |
| 2016/0057940 A1* | 3/2016 | Lyons | A01G 3/037 47/1.43 |

\* cited by examiner

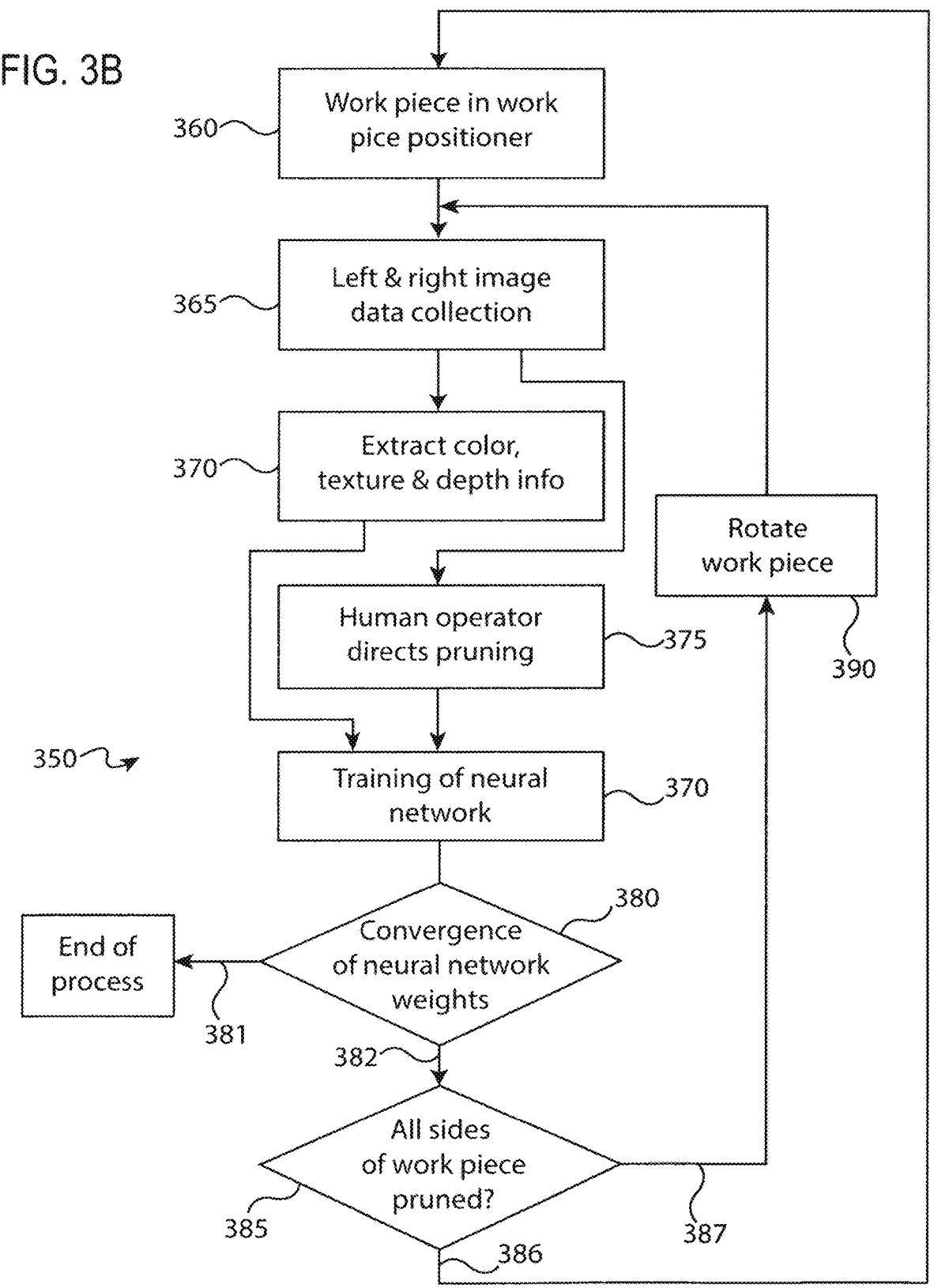

Left raw image 2001

Right raw image 2002

Disparity Map 1201'

Texture Map 1511'

Left image 1301' with ROI List 1521'

Left image 1301' and Motion Comand List 1603'

```
x = Convolution2D(32, 3, 3, input_shape=(1, image_h_v, image_h_v),
activation='relu', border_mode='same', init='uniform')(input_img)
x = Dropout(0.2)(x)
x = Convolution2D(32, 3, 3, activation='relu', border_mode='same')(x)
x = MaxPooling2D(pool_size=(2, 2))(x)
x = Convolution2D(64, 3, 3, activation='relu', border_mode='same')(x)
x = Dropout(0.2)(x)
x = Convolution2D(64, 3, 3, activation='relu', border_mode='same')(x)
x = MaxPooling2D(pool_size=(2, 2))(x)
x = Convolution2D(128, 3, 3, activation='relu', border_mode='same')(x)
x = Dropout(0.2)(x)
x = Convolution2D(128, 3, 3, activation='relu', border_mode='same')(x)
x = MaxPooling2D(pool_size=(2, 2))(x)
x = UpSampling2D(size=(2, 2))(x)
x = Convolution2D(64, 3, 3, activation='relu', border_mode='same')(x)
x = Dropout(0.2)(x)
x = UpSampling2D(size=(2, 2))(x)
x = Convolution2D(32, 3, 3, activation='relu', border_mode='same')(x)
x = Dropout(0.2)(x)
x = UpSampling2D(size=(2, 2))(x)
x = Convolution2D(1, 3, 3, activation='relu', border_mode='same')(x)
model = model = Model(input=input_img, output=x)
# Compile model
epochs = 2000
lrate = 0.01
decay = lrate / epochs
sgd = SGD(lr=lrate, momentum=0.9, decay=decay, nesterov=False)
model.compile(loss='mse', optimizer=sgd, metrics=['accuracy'])
```

**Listing of Keras Python code to create
Texture Neural Network**

*Fig.* 23

```
model = Sequential()
model.add(Convolution2D(128, 31, 31, input_shape=(3, 64, 64), activation='relu', border_mode='same'))
model.add(Dropout(0.4))
model.add(Convolution2D(64, 15, 15, activation='relu', border_mode='same'))
model.add(MaxPooling2D(pool_size=(2, 2)))
model.add(Convolution2D(64, 7, 7, activation='relu', border_mode='same'))
model.add(Dropout(0.4))
model.add(Convolution2D(64, 3, 3, activation='relu', border_mode='same'))
model.add(MaxPooling2D(pool_size=(2, 2)))
model.add(Convolution2D(128, 3, 3, activation='relu', border_mode='same'))
model.add(Dropout(0.4))
model.add(Convolution2D(128, 3, 3, activation='relu', border_mode='same'))
model.add(MaxPooling2D(pool_size=(2, 2)))
model.add(Flatten())
model.add(Dropout(0.4))
model.add(Dense(1024, activation='relu', W_constraint=maxnorm(3)))
model.add(Dropout(0.4))
model.add(Dense(512, activation='relu', W_constraint=maxnorm(3)))
model.add(Dropout(0.4))
model.add(Dense(num_classes, activation='softmax'))
# Compile model
epochs = 100
lrate = 0.01
decay = lrate/epochs
sgd = SGD(lr=lrate, momentum=0.9, decay=decay, nesterov=False)
model.compile(loss='categorical_crossentropy', optimizer=sgd, metrics=['accuracy'])
```

Listing of Keras Python code to create
Structure Neural Network

*Fig.* 24

AUTOMATED PRUNING OR HARVESTING SYSTEM FOR COMPLEX MORPHOLOGY FOLIAGE

RELATED APPLICATIONS

The present non-provisional application is based on and claims priority to non-provisional patent application Ser. No. 15/331,841 by Keith Charles Burden filed Oct. 22, 2016 for "Automated pruning or harvesting system for complex morphology foliage," which is based on and claims priority to provisional patent application Ser. No. 62/250,452 by Keith Charles Burden filed Nov. 3, 2015 for "Automated pruning or harvesting system." In addition, the present non-provisional application is based on and claims priority to provisional patent application Ser. No. 62/929,119 filed Feb. 12, 2018 entitled "Cannabis flower trimming" by Keith Charles Burden. The present application incorporates these applications by reference.

FIELD OF THE INVENTION

The present invention relates to apparatus and method for the automation of agricultural processes, and more particularly to apparatus and method for robotics for automated pruning, harvesting, spraying and/or maintenance of agricultural crops.

The present invention also relates to apparatus and method for differentiation of variations in foliage, including subtle variations such as the detection of variations in the health of foliage, maturity of foliage, chemical content of foliage, ripeness of fruit, locations of insects or insect infestations, etc.

The present invention also relates to object recognition, particularly object recognition utilizing multiple types of image information, such multiple types of image information for instance including texture and/or shape and/or color.

The present invention also relates to the training and use of neural networks, and particularly the training and use of neural networks for image segmentation classification and/or the extraction of features in objects having features on many length scales or a wide spectrum of length scales.

BACKGROUND OF THE INVENTION

In the present specification, "foliage" is meant to be a general term for plant matter which includes leaves, stems, branches, flowers, fruit, berries, roots, etc. In the present specification, "harvest fruit" is meant to include any plant matter, whether fruit, vegetable, leaf, berry, legume, melon, stalk, stem, branch, root, etc., which is to be harvested. In the present specification, "pruning target" is meant to include any plant matter, whether fruit, vegetable, leaf, berry, legume, melon, stalk, stem, branch, root, etc., which is retained or pruned to be discarded. In the present specification, "color" is meant to include any information obtained by analysis of the reflection of electromagnetic radiation from a target. In the present specification, a "feature characteristic" of a workpiece or a "workpiece feature" is meant to include any type of element or component such as leaves, stems, branches, flowers, fruit, berries, roots, etc., or any "color" characteristic such as color or texture. In the present specification, a "neural network" may be any type of deep learning computational system.

Marijuana is a genus of flowering plants that includes three different species: *Cannabis sativa, Cannabis indica* and *Cannabis ruderalis*. Marijuana plants produce a unique family of terpeno-phenolic compounds called cannabinoids. Over 85 types of cannabinoids from marijuana have been identified, including tetrahydrocannabinol (THC) and cannabidiol (CBD). Strains of marijuana for recreational use have been bred to produce high levels of THC, the major psychoactive cannabinoid in marijuana, and strains of marijuana for medical use have been bred to produce high levels of THC and/or CBD, which is considerably less psychoactive than THC and has been shown to have a wide range of medical applications. Cannabinoids are known to be effective as analgesic and antiemetic agents, and have shown promise or usefulness in treating diabetes, glaucoma, certain types of cancer and epilepsy, Dravet Syndrome, Alzheimer's disease, Parkinson's disease, schizophrenia, Crohn's, and brain damage from strokes, concussions and other trauma. Another useful and valuable chemical produced by marijuana plants, and particularly the flowers, is terpenes. Terpenes, like cannabinoids, can bind to receptors in the brain and, although subtler in their effects than THC, are also psychoactive. Some terpenes are aromatic and are commonly used for aromatherapy. However, chemical synthesis of terpenes is challenging because of their complex structure, so the application of the present invention to marijuana plants is valuable since it produces an increased efficiency in the harvesting of terpenes and cannabinoids. Billions of dollars has been spent in the research, development and patenting of cannabis for medical use. Twenty of the fifty U.S. states and the District of Columbia have recognized the medical benefits of cannabis and have decriminalized its medical use. Recently, U.S. Attorney General Eric Holder announced that the federal government would allow states to create a regime that would regulate and implement the legalization of cannabis, including loosening banking restrictions for cannabis dispensaries and growers.

Marijuana plants may be male, female, or hermaphrodite (i.e., of both sexes). The flowers of the female marijuana plant have the highest concentration of cannabinoids and terpenes. In the current specification, the term "bud" refers to a structure comprised of a volume of individual marijuana flowers that have become aggregated through means of intertwined foliage and/or adhesion of their surfaces. As exemplified by an exemplary female bud (100) shown in FIG. 6A, the flower buds of the female plant generally have a very complex structure. Furthermore, the flower buds of the female plant have an extremely wide spectrum of the morphologies across strains and even from plant to plant. The cannibinoids and terpenes in marijuana are predominantly located in resin droplets, which may appear white, yellow or red, at the tips of small, hair-like stalks which are typically less than 1 mm in height. These small hairs and resin droplets are known as trichomes. Stems (630), shade leaves (620) (i.e., the palmate leaves which emanate from the stem (630)), and sugar leaves (610) (i.e., the isolated leaves which emanate from within and are involuted with the high-resin portions of the bud (100)) generally have a low surface density of trichomes, and it is therefore preferable to trim them from the buds before consumption or processing. The shade leaves (620) and particularly the sugar leaves (610) come in a wide variety of shapes and sizes, and sprout from a variety of locations, including from crannies and crevices of the bud (100). According to conventional practice, the shade leaves (620) and sugar leaves (610) are removed by pruning them (110) from the bud (100) by hand with a scissor, before consumption or further processing. Developing a system for automated trimming of stems (630), shade leaves (620), and sugar leaves (610) involves the challenges of robust object recognition and designing robotics for the pruning of complex and/or irregular shapes. In fact, it seems typical marijuana buds (100) have a more complex spectrum of length scale features than any other type of plant or plant component in general agricultural use, and possibly a more complex spectrum of length scale features than any other type of plant or plant component. Therefore, the challenges involved in implementing the preferred embodiment described herein is to provide a system which is adaptable to almost any agricultural crop, essentially any agricultural operation, and many types of workpieces beyond agriculture.

Therefore, although a preferred embodiment of the present invention described in the present specification is an automated system for trimming stems, shade leaves, and sugar leaves from the buds of marijuana plants, it should be understood that the present invention can be broadly applied to automated pruning, harvesting, spraying, or other maintenance operations for a very wide variety of agricultural crops. A large fraction of the cost of production of many agricultural crops is due to the human labor involved, and effective automation of pruning, trimming, harvesting, spraying and/or other maintenance operations for agricultural crops can reduce costs and so is of enormous economic importance.

It is therefore an object of the present invention to provide an apparatus and method for the automation of pruning, harvesting, spraying or other forms of maintenance of plants, particularly agricultural crops.

It is another object of the present invention to provide an apparatus and method for the automation of pruning, harvesting, spraying or other maintenance operations for plants having complex morphologies or for a variety of plants of differing, and perhaps widely differing, morphologies.

It is another object of the present invention to provide an apparatus and method for automated pruning, harvesting, spraying or other maintenance operations for agricultural crops which analyzes and utilizes variations, and perhaps subtle variations, in color, shape, texture, chemical composition, or location of the harvest fruit, pruning targets, or surrounding foliage.

It is another object of the present invention to provide an apparatus and method for detection of differences, and perhaps subtle differences, in the health, maturity, or types of foliage.

It is another object of the present invention to provide an apparatus and method for pruning of plants having complex morphologies utilizing a neural network, and more particularly a neural network where the complex morphologies prevents unsupervised training of the network, for instance, because autocorrelations do not converge.

It is another object of the present invention to provide an apparatus and method for pruning of plants having complex morphologies using a scissor-type tool.

It is another object of the present invention to provide a scissor-type tool for pruning of resinous plants.

It is another object of the present invention to provide a scissor-type tool for pruning of resinous plants with a means and/or mechanism for overcoming resin build-up and/or clogging on the tool.

Additional objects and advantages of the invention will be set forth in the description which follows, and will be obvious from the description or may be learned by practice of the invention. The objects and advantages of the invention may be realized and obtained by means of the instrumentalities and combinations particularly pointed out in the claims which will be appended to a non-provisional patent application based on the present application.

BRIEF DESCRIPTION OF THE DRAWINGS

FIG. 3B shows the training process according to the preferred embodiment of the present invention.

FIG. 23 is a listing of Keras Python code to create a neural network according to the alternate embodiment of the present invention.

FIG. 24 is a listing of Keras Python code to create a neural network according to the alternate embodiment of the present invention.

DETAILED DESCRIPTION OF A PREFERRED EMBODIMENT

Figure 1:
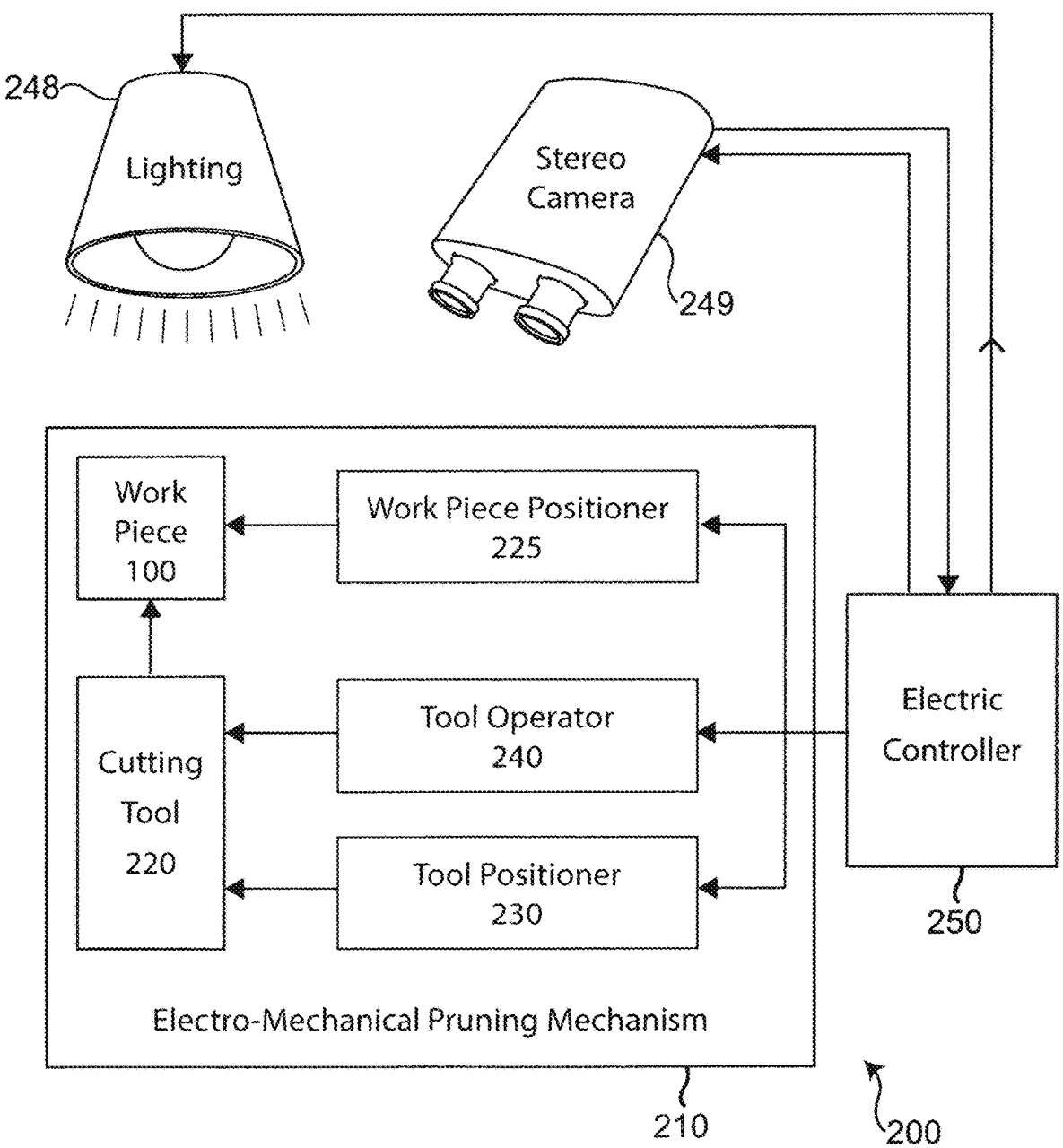
FIG. 1 is a schematic of the system of a preferred embodiment of the present invention.

A schematic of the system (200) of a preferred embodiment of the present invention is shown in FIG. 1. The system (200) has an electro-mechanical pruning mechanism (210), a lighting system (248), a stereoscopic camera (249), and an electric controller (250). The electric controller (250) may be implemented in software or hardware or both, and may for instance be a desktop computer, a laptop computer, a dedicated microprocessor, etc. When not explicitly mentioned in the present specification, control and processing operations are performed by the electric controller (250). As discussed below, the electric controller (250) includes standard (non-neural) processing and neural network processing. The electric controller (250) interfaces to and controls the lighting (248) and the electro-mechanical pruning mechanism (210), and interfaces to the stereoscopic camera (249) to control its operation and to receive image data from it (249). The electro-mechanical pruning mechanism (210) has a workpiece positioner (225) which holds and positions the workpiece (100) (i.e., the bud or other pruning target or harvest fruit), a cutting tool (220), a cutting tool positioner (230), and a cutting tool operator (240).

Figure 2:
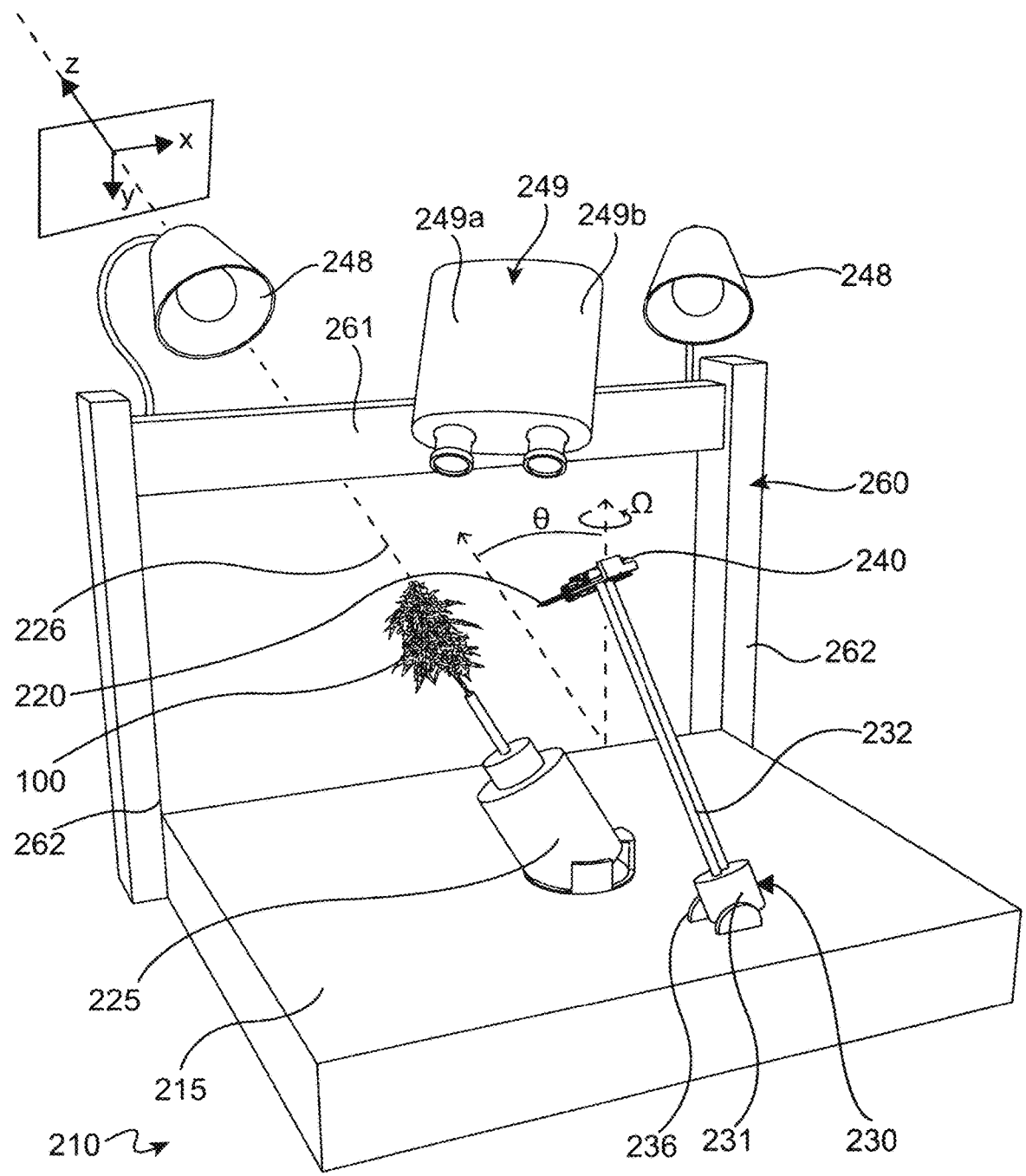
FIG. 2 shows an electro-mechanical apparatus according to the preferred embodiment of the present invention.

FIG. 2 shows an orthographic view of a preferred embodiment of the electro-mechanical pruning apparatus (210). The pruning apparatus (210) has a bed (215) on which is mounted the workpiece positioner (225), the tool operator (240), and the tool positioner (230). Mechanically interfaced to the tool operator (240) and the tool positioner (230) is the cutting tool (220), which in the preferred embodiment is a scissors. The workpiece positioner (225) includes a gripping mechanism (not visible in FIG. 2) which can grip and release the workpiece (100). For purposes of the present exposition, the x axis is horizontal and the y axis is downwards, as is shown in FIG. 2. The workpiece positioner (225) is controlled by the electric controller (250) to produce rotation of the workpiece (100). According to the preferred embodiment, the workpiece (100) is gripped so that it is rotatable along an axis (that will be referred to as the z axis (226)) by the workpiece positioner (225) about what is roughly the longitudinal axis of the workpiece (100), and translatable along the x and y axes. The tool positioner (230) controls the position and orientation of the cutting tool (220). In particular, the tool positioner (230) has a tool positioner base (231) and a strut (232) extending therefrom, the strut (232) being pivotably connected to the cutting tool (220) at the tool operator (240). The protrusion distance of the strut (232) from the tool positioner base (231) is controlled by the electric controller (250). Causing the strut (232) to protrude or retract causes the cutting tool (220) to move outwards or inwards, respectively, relative to the base (231) and work product (100). The tool operator (240) also functions as an orientation control mechanism which can rotate the cutting plane of the cutting tool (220) about the x axis (where the angular displacement about the x axis from a plane parallel to the x-y plane is θ), and can rotate the cutting plane of the cutting tool (220) about the y axis (where the angular displacement about the y axis from a plane parallel to the x-y plane is Ω). Connecting the tool positioner base (231) to the bed (215) is a pivot mechanism (236) controlled by the electric controller (250). The pivot mechanism (236) rotates the tool positioner base (231) in a vertical plane by a small distance so the cutting tool (220) can engage with the workpiece (100). Given the control of the orientation of the workpiece (100) by the workpiece positioner (225), and control of the position of the cutting tool (220) by the tool positioner base (230), the cutting tool (220) can cut the workpiece (100) at any location on the workpiece (100) and at any orientation relative to the workpiece (100).

Extending vertically from the bed (215) is a span structure (260) having two side legs (262) and a crossbar (261). Mounted near the center of the crossbar (261) is a stereoscopic camera (249) having a left monoscopic camera (249a) and a right monoscopic camera (249b). The left monoscopic camera (249a) is oriented so as to be viewing directly down on the workpiece (100), i.e., the center of viewing of the left monoscopic camera (249a) is along the y axis. Therefore, the right monoscopic camera (249b) is oriented so as to be slightly offset from viewing directly down on the workpiece (100). To each side of the stereoscopic camera (249) are lights (248) which are oriented to illuminate the workpiece (100) with white light. The white light is produced light emitting diodes (LEDs) which at least produce light in the red, green and blue frequency ranges.

Figure 3A:
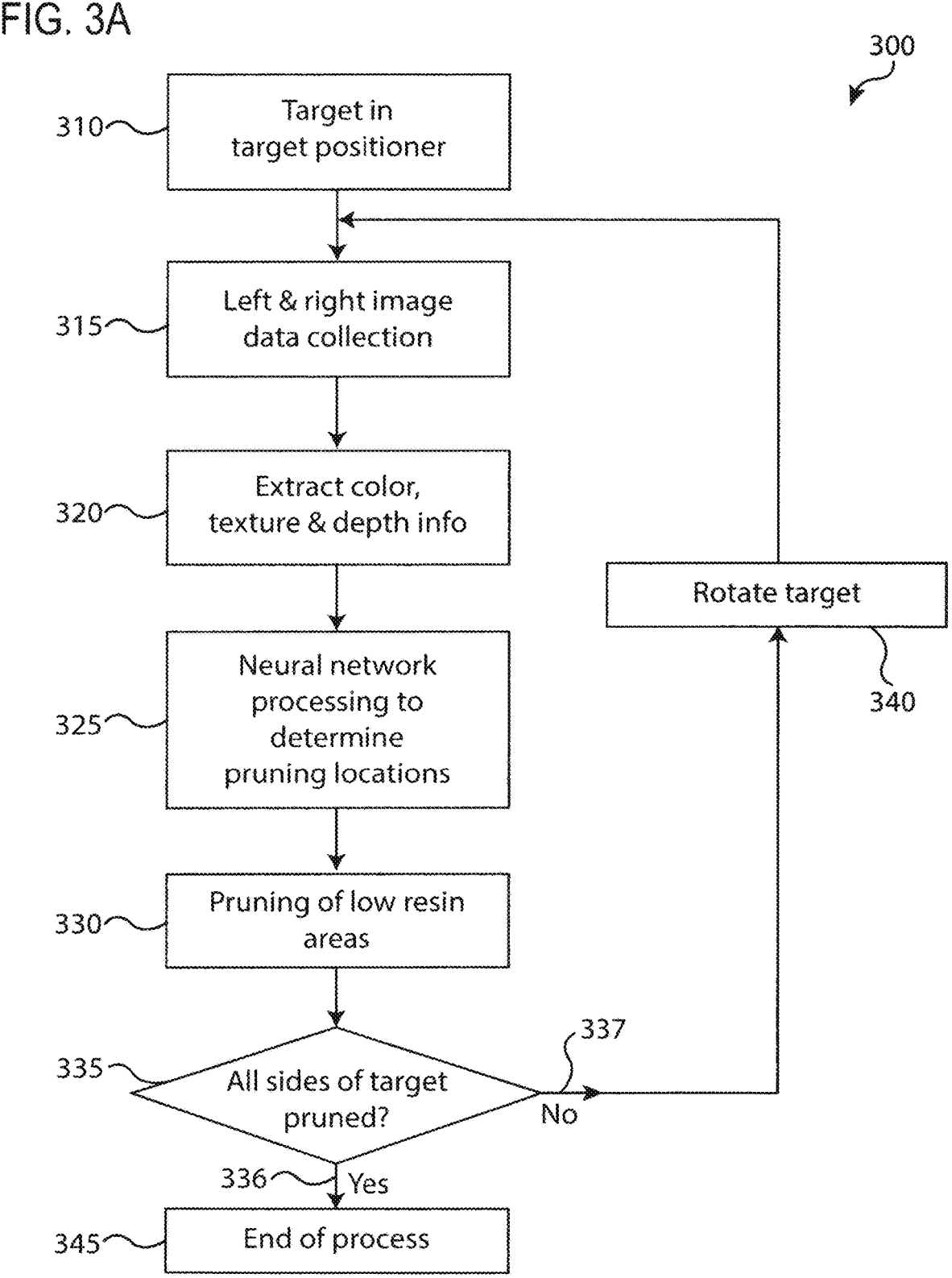
FIG. 3A shows the pruning process according to the preferred embodiment of the present invention.
Figure 4:
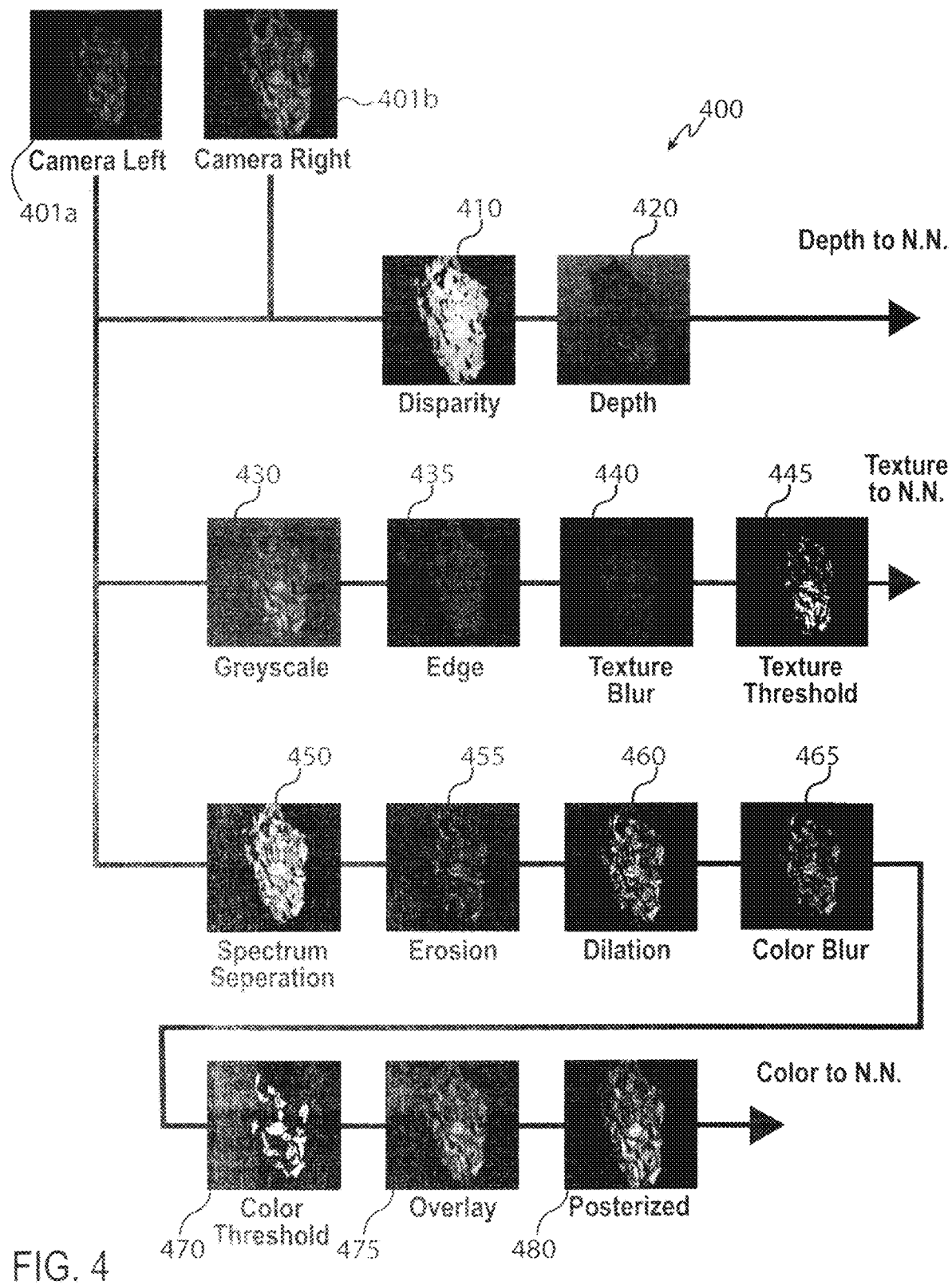
FIG. 4 shows the process of analysis of a stereoscopic image of a workpiece to produce the depth, texture and color data used by the neural network according to a first preferred embodiment of the present invention.

FIG. 3A shows the pruning process (300) according to the preferred embodiment of the present invention. Once the workpiece (100) is placed (310) in the workpiece positioner (225), the stereoscopic camera (249) photographs the workpiece (100) to produce left and right camera image data (having reference numerals (401a) and (401b), respectively, in FIG. 4) which is collected (315) by the electric controller (250). The electric controller (250) extracts (320) depth, texture and color information from the image data (401a) and (401b) to produce a depth image (420), texture threshold image (445), and posterized color image (480) (as depicted in FIG. 4 and discussed in detail below). The depth image (420), texture threshold image (445) and posterized color image (480) are fed to the neural network (500), shown in FIG. 5 and discussed in detail below, and the neural network (500) utilizes those images (420), (445) and (480) to determine (325) the pruning operations on the workpiece (100) necessary to remove low resin-density areas. The electric controller (250) then prunes (330) the low resin-density areas according to the operations determined by the neural network (500). Once the pruning operations (330) have been performed, it is determined (335) whether all sides of the workpiece (100) have been pruned. If so (336), the pruning process (300) is complete (345). If not (337), the workpiece (100) is rotated (340) by a rotation increment by the workpiece positioner (225), and the process returns to the collection (315) of left and right image data (401*a*) and (401*b*). The rotation increment is the width of the swath which the cutting tool (220) can cut on the workpiece (100) (without rotation of the workpiece (100) by the workpiece positioner (225)), which in the preferred embodiment is roughly 1 cm.

Figure 5:
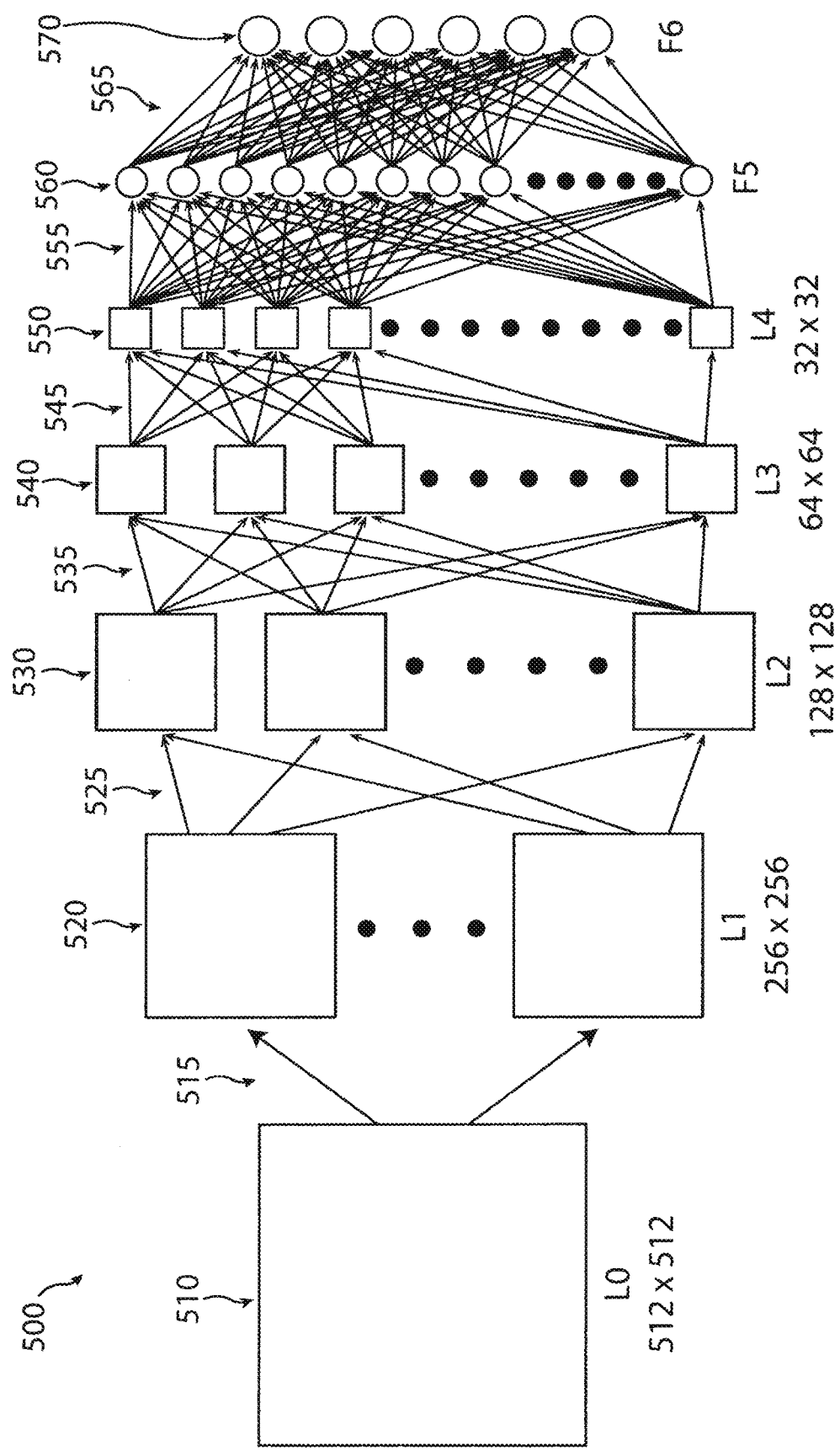
FIG. 5 shows the convolution neural network according to the preferred embodiment of the present invention for processing of the depth, texture and color data to produce information required for pruning.

FIG. 3B shows the process (350) used to train the neural network (500) utilized in the pruning process (300) of FIG. 3A. The process begins with a workpiece (100) being placed (360) in the workpiece positioner (225). The stereoscopic camera (249) photographs the workpiece (100) to produce left and right camera image data (401*a*) and (401*b*) which is collected (365) by the electric controller (250). The electric controller (250) extracts (370) depth, texture and color information from the image data (401*a*) and (401*b*) to produce the depth image (420), texture threshold image (445), and posterized color image (480) as discussed in detail below in conjunction with FIG. 4. The depth image (420) and texture threshold image (445) are fed to the neural network (500), which is shown in FIG. 5 and discussed in detail below. A human trainer examines the workpiece (100) to locate low resin-density foliage and directs (375) the tool positioner (230) and the tool operator (240) to prune away the low resin-density areas. The details of where the human trainer has executed pruning are also fed to the neural network (500) for use in the training (377) of the neural network (500) as described below in conjunction with the description of the neural network (500) of FIG. 5. Utilizing the training information from the human trainer and the depth image (420) and texture threshold image (445), the neural network (500) is trained (377) using back propagation, as is well known in the art and described in detail in "Neural Networks for Pattern Recognition" by Christopher M. Bishop, Oxford University Press, England, 1995, which is incorporated herein by reference. Then it is determined whether the weights (which are labeled with 530-series reference numerals in FIG. 5 and will be referred to collectively with the reference numeral "530") of the synapses (which are labeled with 520-series reference numerals in FIG. 5 and will be referred to collectively with the reference numeral "520") have converged sufficiently to produce an "error rate" (which is defined as the difference between the current neural network's training output and the labeled test data) which is below a predetermined value to consider the neural network (500) trained, as is described in detail below in conjunction with the description of FIG. 5. If the neural network weights (530) have converged (381), the training process (350) is ended. If the neural network weights (530) have not converged (382), then it is determined (385) whether all sides of the workpiece (100) have been pruned. If not (387), then the workpiece (100) is rotated (390) by the workpiece positioner (225) by a rotation increment (as described above in FIG. 3A). If so (386), then another workpiece (100) is put (360) in the workpiece positioner (225), and the process continues as described above.

FIG. 4A shows the stages of image processing (400) of the workpiece (100) according to the preferred embodiment of the present invention to create the depth image (420) and texture threshold image (445) which are fed to a neural network (500) (which is shown in FIG. 5 and discussed in detail below) to determine which low resin-density areas should be removed. In particular, the stereoscopic camera (249) photographs the workpiece (100) to produce left camera image data (401*a*) and right camera image data (401*b*), which is sent to the electric controller (250). For each pair of camera images (401*a*) and (401*b*) the electric controller (250) generates a disparity image (410) which is a grey-scale image where the spatial disparity between each point on the workpiece (100) as viewed by the left and right cameras (249*a*) and (249*b*), respectively, is reflected in the degree of whiteness of the associated pixel, with closer areas on the workpiece (100) being more white and farther areas being more black. More particularly, the disparity image (410) is produced by the application of intrinsic and extrinsic matrices, where the extrinsic matrix calculations correct for imperfections in the optics, and the intrinsic matrix calculations determine depth based on the differences in the two images. The electric controller (250) converts the disparity image (410) to a depth image (420) by (i) converting the 8-bit integer disparity values from the disparity image (410) to a floating point number representing the distance of that point on the workpiece (100) from a ground plane in millimeters, where the ground plane is a plane which is located behind the workpiece (100) and is parallel to the x-z plane, and (ii) mapping color information from the left stereo camera (401*a*) onto the depth information. Mapping the color information onto the depth information allows for easy and rapid visual verification of the accuracy of the depth determination process. A monochromatic grey-scale version of the left camera image (401*a*) is fed to the neural network (500).

The resin droplets at the tips of the trichomes have a maximum diameter of about 120 microns, and the hairs have a maximum height of about 135 microns. The preferred embodiment of the present invention therefore determines texture on a characteristic texture length scale δ of approximately 0.2 mm to determine regions of high and low trichome (and therefore cannabinoid) density.

As also shown in FIG. 4A, a thresholded texture image (445) derived from the left and right camera images (401*a*) and (401*b*) is fed to the neural network (500). The thresholded texture image (445) shows areas of high and low smoothness on the characteristic texture length scale δ of 0.2 mm. The thresholded texture image (445) is generated by processing the left and right camera images (401*a*) and (401*b*) to produce a grey scale image (430) representing the roughness on the length scale of 0.2 mm through the application of a cross-correlation filter, which according to the preferred embodiment of the present invention is a Gabor correlation filter. The grey scale image (430) has 8-bit resolution where the rougher the region on the length scale of trichomes, the whiter the region. Smooth areas (i.e., areas with few surface features, such as no trichomes) show as black, and areas with closely-spaced trichomes show as white. Next, edges are determined by taking the Laplacian (i.e., the spatial divergence of the gradient of the pixel values) of the grey scale image (430) to generate an edge image (435). The edge image (435) shows the edges of the regions of high trichome density irrespective of illumination, e.g., irrespective of whether a region is shadowed, since it is dependent on derivatives, in this case second derivatives. Of possible derivatives, the Laplacian has the advantage of naturally providing a field of scalars which is invariant under coordinate rotations and translations. The enlarged view of the edge image (435) provided in FIG. 4 shows a grey-scale image, although at a higher resolution the image (435) would be a complex, topological map-like image of closely-spaced curvy lines. The edge image (435) is then blurred over a length scale of a small multiple n of the characteristic texture length scale δ by convolution of the edge image (435) with a Gaussian with a width of nδ to provide a texture blur image (440), where the multiple n is preferably a relatively small, odd number such as 3 or 5. The greater the density of edges, the more white lines will appear in an area, and upon blurring the whiter that area will appear in the texture blur image (440). The texture blur image (440) is then thresholded by the application of a step function to provide a texture threshold image (445) where white areas correspond to areas with a density of trichomes above a threshold amount and black areas correspond to areas with a density of trichomes below a threshold amount. The texture threshold image (445) is directed to the neural network (500).

As also shown in FIG. 4A, a posterized color image (480) derived from the left and right camera images (401a) and (401b) is fed to the neural network (500). The posterized color image (480) is a low color-resolution picture of the green areas of the left camera image (401a). The lights (248) illuminate the workpiece (100), as shown in FIGS. 1 and 2 and discussed above, with white light. The stereoscopic camera (249) feeds the image data for the left and right camera images (401a) and (401b) to the electric controller (250) which performs a hue-saturation-value spectral analysis on the image data (401a) and (401b) to produce a spectrum separation image (450) to locate areas reflecting green light, i.e., light with wavelengths between 490 and 575 nm. Because the spectrum separation image (450) may show small specks of trichomes in areas that are not of high trichome density, for instance due to trichomes becoming dislodged from the workpiece (100) during handling, the next step is an erosioning to reduce such "speckle noise." In particular, each green area in the spectrum separation image (450) is eroded by a single pixel along the circumference of the area (where a single pixel represents roughly a 0.2 mm×0.2 mm area) to produce an erosion image (455). To restore non-noise areas to their original size, each green area is then dilated by adding a pixel-width line along the circumference of the green area to produce a dilation image (460). The colors in the dilation image (460) are then blurred by color averaging over an area which is preferably 3 or 5 pixels in width to produce a color blur image (465). The color blur image (465)—which is a grey scale representation of the greens—is then thresholded via the application of a step function to the color blur image (465) to produce a black and white image (not depicted in FIG. 4A). The location of the step in the step function is a variable that may be under user control. Adjustment of the location of the step determines the thoroughness of the pruning of the workpiece (100). Setting the step location to a high value will bias the system towards ignoring small low resin-density areas, while setting the step location to a low value will bias the system towards pruning the smaller low resin-density areas. Then, convex hulls are created for each white area according to the process described below, and regions with a convex hull having an area below a threshold size are discarded, i.e., overwritten with black, to produce the color threshold image (470).

Figure 6A:
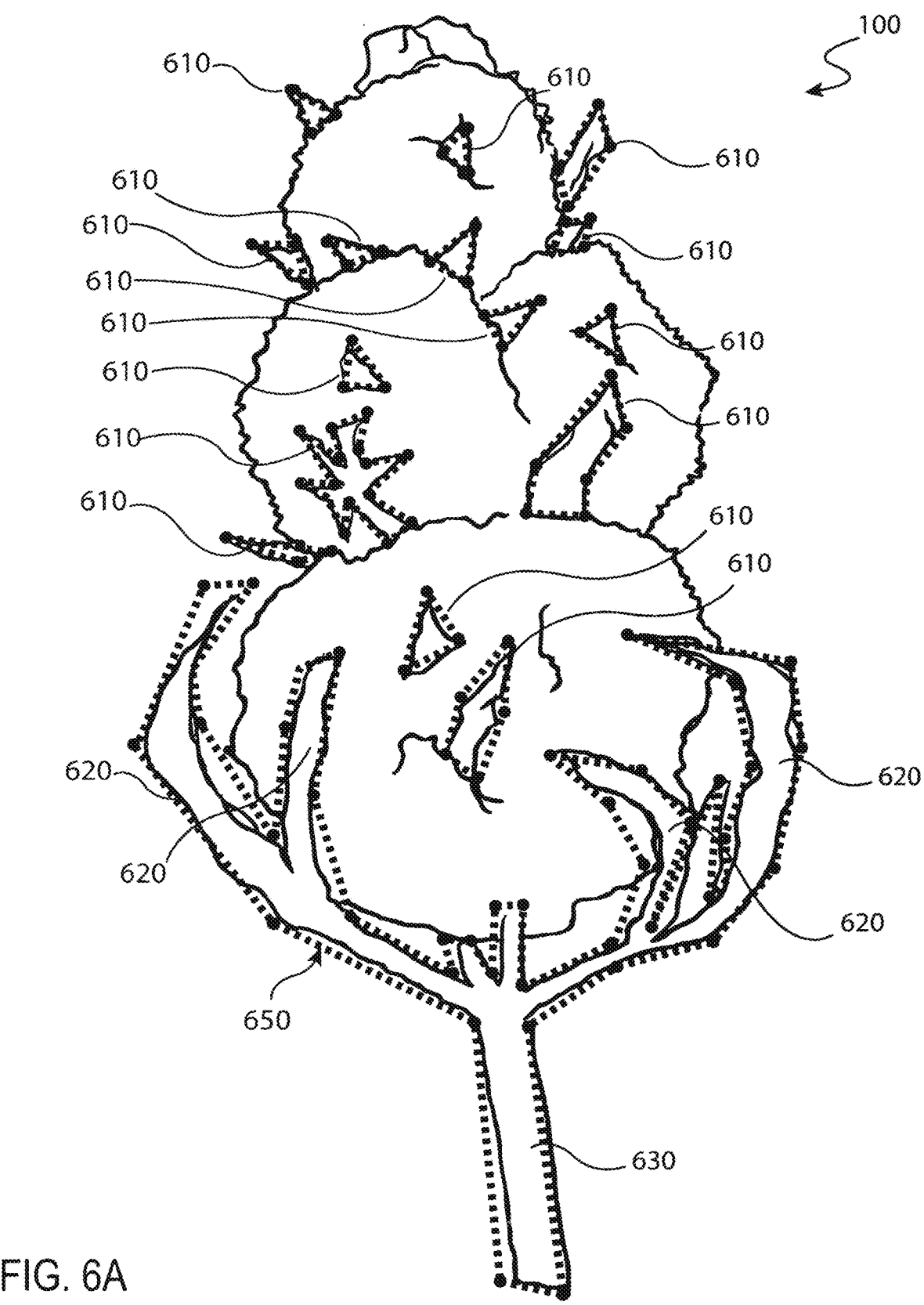
FIG. 6A shows the convex hull vertices of an exemplary cannabis bud.
Figure 6B:
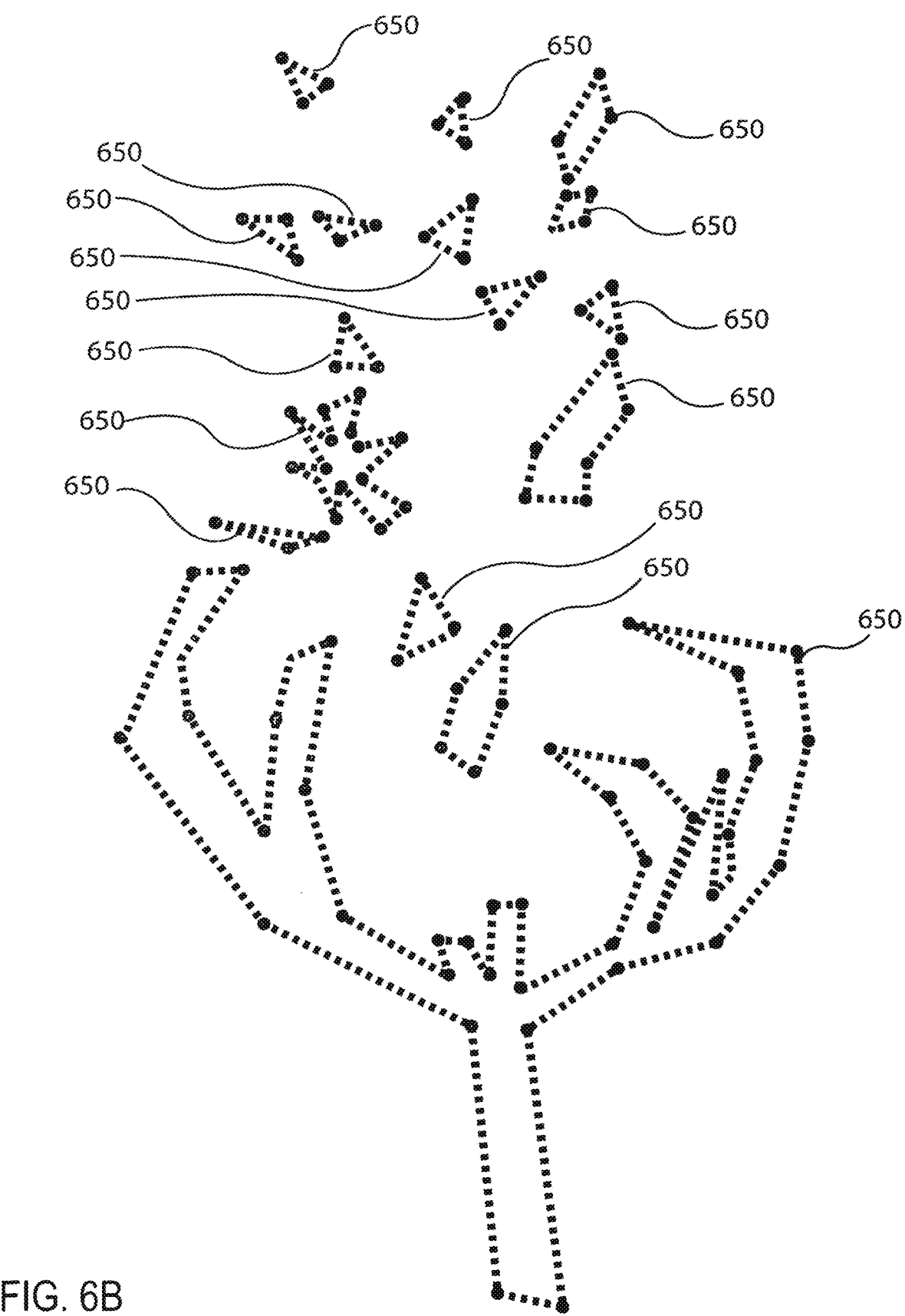
FIG. 6B shows the convex hull vertices without depiction of the exemplary cannabis bud from which the convex hull vertices were generated.

A set of points on a plane is said to be "convex" if it contains the line segments connecting each pair of its points, and the convex hull vertices are the vertices of the exterior line segments of the convex set. FIG. 6A shows an exemplary bud (100) with a stem (630), shade leaves (620) emanating from the stem (630), and sugar leaves (610) emanating from high-resin portions of the bud (100). FIG. 6A also shows the convex hull vertices (650) of the convex hulls which surround the stem (630), shade leaves (620), and sugar leaves (610). For clarity, FIG. 6B shows the convex hull vertices (650) without depiction of the bud (100) from which the convex hull vertices (650) were generated. It should be noted that convex hull vertices (650) of one object may meet the convex hull vertices of another object. For instance, in FIGS. 6A and 6B it can be seen that the convex hull vertices (650) of the shade leaves (620) meet each other, and the convex hull vertices (650) of the shade leaves (620) meet the convex hull vertices of the stem (630). From the convex hulls, the centroid, longitudinal axis, area, mean color, mean texture, and the standard deviation of the texture are calculated. As mentioned above, regions with a convex hull having an area below a threshold size are discarded, i.e., overwritten with black, to produce the color threshold image (470). The other information computed from the convex hulls is also fed to the neural network (500) due to the usefulness of the information in, for instance, differentiating between leaves and stems.

To increase the amount of information in the image, the color threshold image (470) is combined with the green, blue and black color information from the original left camera image (401a) to produce an overlay image (475), where the blacks represent the low resin areas. Finally, the overlay image (475) is posterized to reduce the color palette, producing a posterized image (480) which is fed to the neural network (500). In particular, the posterizing process maps the spectrum of greens in the overly image (475) to eight greens to produce the posterized image (475).

FIG. 5 shows a convolutional neural network (500) according to the preferred embodiment of the present invention for processing of the depth data (420) and texture data (445) to produce information required for pruning (330) of the low resin areas of the bud (100). The convolutional neural network (500) has an initial layer (510) which is the input data (420), (445) and (480), a first feature map layer L1 (520), a second feature map layer L2 (530), a third feature map layer L3 (540), a fourth feature map layer L4 (550), a neuron layer (560), and an output layer (570). The input layer L0 (510) is a 256×256 array of the depth and texture pixels (420) and (445), respectively, described with reference to FIG. 4A above. The input data of the initial layer (510) undergoes a first set of convolution processes (515) to produce the feature maps of the first layer L1 (520), the feature maps of the first layer L1 (520) each undergo a second set of convolution processes (525) to produce the feature maps of the second layer L2 (530), etc. Each convolution process (515), (525), (535), and (545) has the form $$L(n+1)[m,n] = b + \Sigma_{k=0,K-1} \Sigma_{l=0,K-1} V^{(n+1)}[k,l] Ln[m+k, n+l], \quad (1)$$

where $V^{(n)}$ is the feature map kernel of the convolution to generate the $n^{th}$ convolution layer, and the convolution is over K×K pixels. Convolution is useful in image recognition since only local data from the $n^{th}$ layer Ln is used to generate the values in $(n+1)^{th}$ layer L(n+1). A K×K convolution over an M×M array of image pixels will produce an (M−K+1)× (M−K+1) feature map. For example, 257×257 convolutions (i.e., K=257) are applied (515) to the 512×512 depth, texture and color pixel arrays (420), (445) and (480) to provide the 256×256 pixel feature maps of the first layer L1 (520). The values in the first neuron layer F5 (560) are generated (555)

from the feature maps of the fourth convolution layer L4 (550) by a neural network mapping of the form $$F5 = \Phi_5(\Sigma_{k=0,\,31} \Sigma_{l=0,\,31} W^{(5)}[k, l] L4[k, l]) \qquad (2)$$

where $W^{(5)}[k, l]$ are the weights of the neurons (555) and $\Phi_5$ is an activation function which typically resembles a hyperbolic tangent. Similarly, the outputs F6 (570) of the convolution neural network (500) are generated (565) by a neural network mapping of the form $$F6 = \Phi_6(\Sigma_j W^{(6)}[j] F5[j]) \qquad (3)$$

where $W^{(6)}$ are the weights of the neurons (555) and $\Phi_6$ is an activation function which typically resembles a hyperbolic tangent. The values of the feature map kernels V and weights W are trained by acquiring pruning data according to the process of FIG. 4B described above and using back propagation, as is well known in the art and described in detail in "Neural Networks for Pattern Recognition" by Christopher M. Bishop, Oxford University Press, England, 1995, which is incorporated herein by reference. The output values F6 (570) are the pruning instructions which are sent by the electric controller (250) to control the tool positioner (230), tool operator (240), and workpiece positioner (225). In particular, the tool position (230) is given x, y and z position coordinates and orientation angles for the cutting tool (220), and the workpiece positioner is given a z position coordinate and a θ orientation coordinate for each pruning operation (330).

Figure 7A:
FIG. 7A shows an exemplary workpiece with shade and sugar leaves.
Figure 7B:
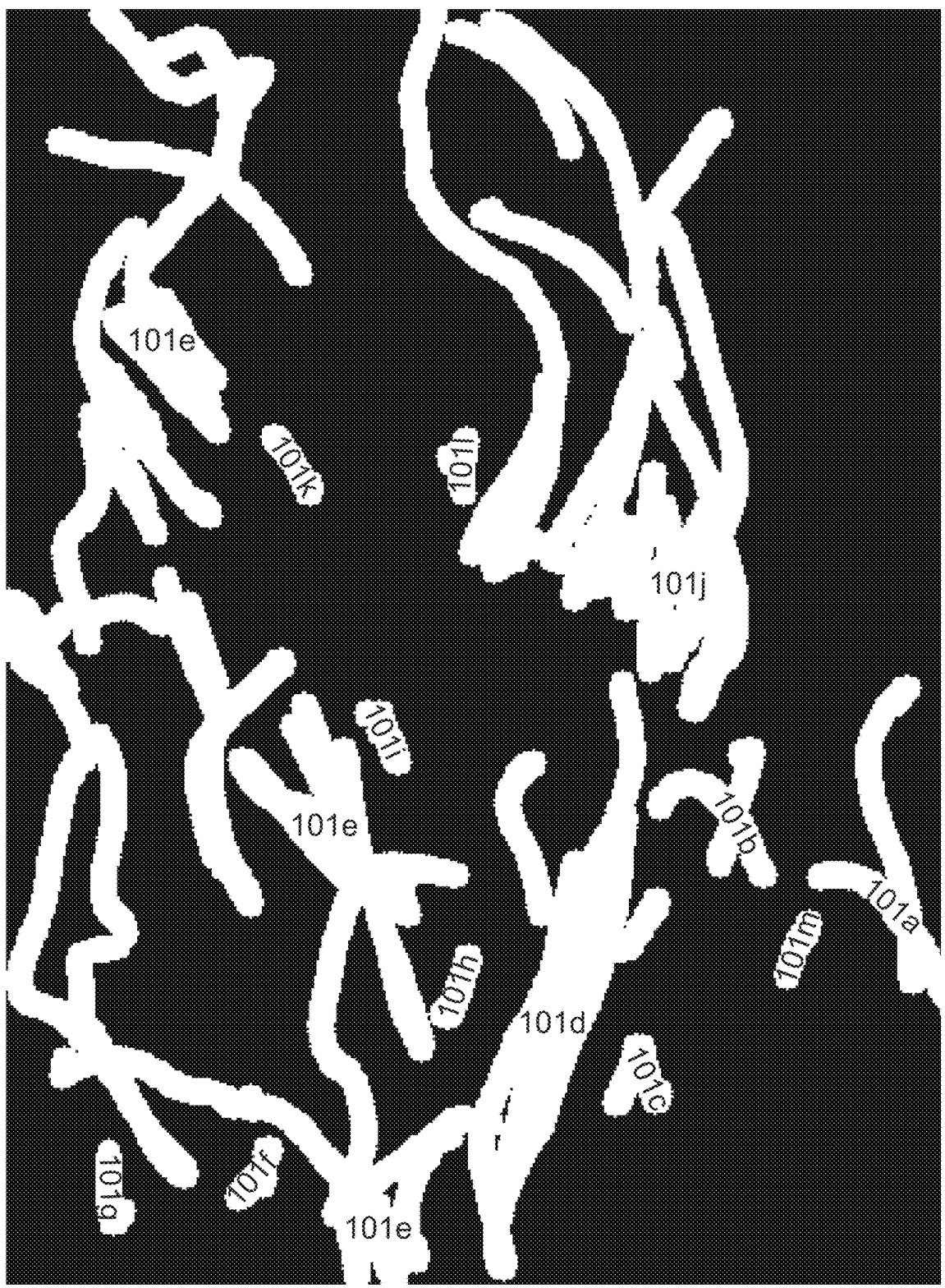
FIG. 7B shows human-identified regions where shade and sugar leaves are located on the workpiece of FIG. 7A.

Alternatively, a convolutional neural network may operate directly on an image of a workpiece without the separate texture and color analysis described above. Rather, the convolutional neural network may be trained by supervised learning to recognize areas to be trimmed. FIG. 7A shows a workpiece and FIG. 7B, when overlayed with the image of FIG. 7A, shows white regions which have been identified by a human to be foliage to be removed. Using many such pairs of images as shown in FIGS. 7A and 7B, the convolution neural network of this embodiment of the present invention is trained to recognize foliage to be pruned and/or foliage to be harvested.

Figure 8:
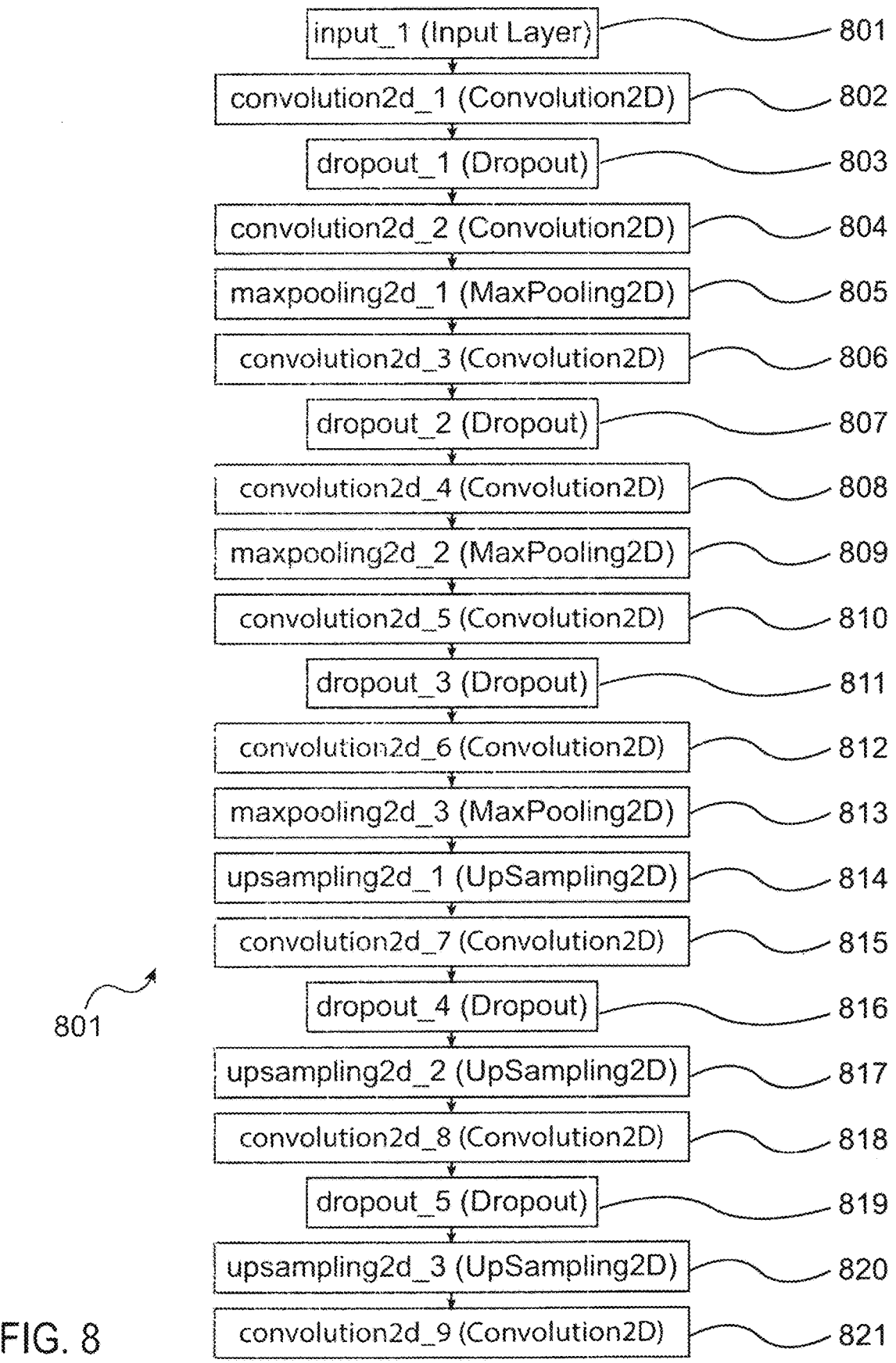
FIG. 8 shows a schematic of a convolutional neural network according to an alternative preferred embodiment for classification of low trichome density regions on a marijuana bud.

This embodiment of a convolution neural network (800) according to the present invention for processing an image of a workpiece (100) to identify regions of the workpiece (100) to be pruned is shown in FIG. 8, and Keras library code for the convolution neural network (800) is as follows (with line numbers in the left hand margin added for ease of reference):

```
1  x=Convolution2D(32, 3, 3, input_shape=(1, image_h_v, image_h_v),
2  activation='relu', border_mode='same', init='uniform')(input_img)
3  x=Dropout(0.2)(x)
4  x=Convolution2D(32, 3, 3, activation='relu', border_mode='same')(x)
5  x=MaxPooling2D(pool_size=(2, 2))(x)
6  x=Convolution2D(64, 3, 3, activation='relu', border_mode='same')(x)
7  x=Dropout(0.2)(x)
8  x=Convolution2D(64, 3, 3, activation='relu', border_mode='same')(x)
9  x=MaxPooling2D(pool_size=(2, 2))(x)
10 x=Convolution2D(128, 3, 3, activation='relu', border_mode='same')(x)
11 x=Dropout(0.2)(x)
12 x=Convolution2D(128, 3, 3, activation='relu', border_mode='same')(x)
13 x=MaxPooling2D(pool_size=(2, 2))(x)
14 x=UpSampling2D(size=(2, 2))(x)
15 x=Convolution2D(64, 3, 3, activation='relu', border_mode='same')(x)
16 x=Dropout(0.2)(x)
17 x=UpSampling2D(size=(2, 2))(x)
18 x=Convolution2D(32, 3, 3, activation='relu', border_mode='same')(x)
19 x=Dropout(0.2)(x)
20 x=UpSampling2D(size=(2, 2))(x)
21 x=Convolution2D(1, 3, 3, activation='relu', border_mode='same')(x)
22
23 model=model=Model(input=input_img, output=x)
```

Keras is a modular neural networks library based on the Python and Theano programming languages that allows for easy and fast prototyping of convolutional and recurrent neural networks with arbitrary connectivity schemes. Documentation for Keras, which for instance can be found at http://keras.io/, is incorporated herein by reference.

Each Convolution2D process (lines 1, 4, 6, 8, 10, 12, 15, 18, and 21) performs the function $$L_{out}[m, n, q] = \Phi[\Sigma_{i=0, K-1} \Sigma_{j=0, K-1} \Sigma_{k=0, D} V^{(q)}[i, j, k] L_{in}[m+i, n+j, k]], \qquad (4)$$

where $L_{in}$ is an input data tensor, $L_{out}$ is an output date tensor, $V^{(q)}$ is the $q^{th}$ feature map kernel, and the convolution is over K×K pixels, and $\Phi$ is the activation function. The variables k and q are commonly termed the depths of the volumes $L_{in}[m, n, k]$ and $L_{out}[m, n, q]$, respectively. A K×K convolution over an M×M array of image pixels will produce $L_{out}$ where m=n=(M−K+1). For example, 3×3 convolutions (i.e., K=3) on a 512×512×k input will produce a 510×510×q output. Convolution is useful in image recognition since only local data from $L_{in}$ is used to generate the values in $L_{out}$.

The input data (801) to the convolution neural network (800) is monoscopic image data taken by the stereoscopic camera (249). Each channel of the stereoscopic data is a 1280×1024 array of grey-scale pixels. Since the computational effort of convolution neural networks is proportional to the area of the processed image, the image is divided into smaller sections (henceforth to be referred to herein as image tiles or tiles) and the tiles are operated upon separately, rather than operating on the entirety of the image, to provide a computational speed-up. For instance, dividing the 1280×1024 pixel image into 256×256 pixel tiles results in a speed-up by a factor of almost 20. According to the preferred embodiment the tiles are 256×256 pixels and the image is tiled by a 4×5 array of tiles. Although reference numerals for the tiles are not utilized in FIGS. 7E, 7F, 7G and 7H, the 4×5 array of tiles is visible in the images of FIGS. 7E, 7F, 7G and 7H. In the text of the present specification tiles, generically and collectively, will be given the reference numeral "700." While even smaller tiles (700) do result in a speed-up in the processing time, according to the present invention the image tiles (700) are not smaller than twice the characteristic width of the largest feature which must be identified by the convolution neural network (800). According to the preferred embodiment of the present invention, the tiles (700) have a width roughly equal to the widest of the shade leaves (620) of the marijuana bud (100), which is approximately 3 cm. This characteristic width may, for instance, be determined by identifying the largest wavelengths in a Fourier analysis of the image, or by directly measuring the widths of shade leaves on a sample foliage. The input data is fed to a first convolution layer (802) which, as per the Convolution2D instruction on lines 1 and 2 of the Keras code provided above, uses 32 feature maps (as per the first argument of the instruction) of size 3×3 (as per the second and third arguments of the instruction) to perform convolution filtering. The input_shape argument specifies that there is one channel of input data, i.e., grey-scale input data, and the height argument image_h_v and width argument image_h_v of the input image input_img, which is the size of an input image tile (700), is specified as 256×256 pixels. According to the present invention the image resolution is selected such that trichomes have a width of one or two pixels. The 3×3 feature maps can therefore function to detect areas which are rough on the length scale of trichomes. Additionally, these 3×3 feature maps function to detect edges of leaves and stems.

As per the activation argument of the Convolution2D instruction on line 2 of the Keras code provided above, the activation function Φ is a relu function. "Relu" stands for REctified Linear Unit and a relu function $f(x)$ has the form $f(x)=\max(0, x)$, i.e., negative values of x are mapped to a zero and positive values of x are unaffected. The size of the input tile (700), feature map dimensions (i.e, 3×3), and step size (which by default, since no step size is specified, is unity) are chosen such that no exceptional processing is required at the borders, so the setting of border_mode='same' indicates no special steps are to be taken. The values to which the weights of the 3×3 feature maps have been initialized by the init argument are 'uniform' i.e., a white noise spectrum of random values.

As shown in FIG. 8, following the first convolution by the Convolution2D instruction (802) of lines 1 and 2 of the Keras code is a Dropout instruction (803) in line 3 of the Keras code. The argument value of 0.2 in the function Dropout means that the contribution of a randomly-chosen 20% of the values in an input data tensor $L_{in}$ are set to zero on the forward pass and value updates are not applied to the randomly-chosen neurons on the backward pass. Dropout is a regularization technique for neural network models proposed by Srivastava, et al. in a 2014 paper entitled "Dropout: A Simple Way to Prevent Neural Networks from Overfitting," *Journal of Machine Learning Research*, 15 (2014) 1929-1958, which is incorporated herein by reference. As per the title of the article, dropout is useful in preventing the large number of weights in a neural networking from producing an overfitting, thereby providing better functioning and more robust neural networks. By randomly removing neurons from the network during the learning process, the network will not come to rely on any subset of neurons to perform the necessary computations and will not get mired in the identification of easily identifiable features at the cost of neglecting features of interest. For instance, without the inclusion of Dropout instructions, the neural network of the present invention gets mired in identifying the black background and would not continue refinement of the weights so as to identify the features of interest.

Following the Dropout instruction (803), the convolution neural network performs a second convolution (804). As shown in line 4 of the Keras code provided above, the convolution again has 32 feature maps of size 3×3, a relu activation function, and the border mode is set to border_mode='same'. All other parameters of the second convolution (804) are the same as those in the first convolution (802). The output of the second convolution (804) is directed to a pooling operation (805) which, as shown in line 5 of the Keras code, is a MaxPooling2D instruction which outputs the maximum of each 2×2 group of data, i.e., for the 2×2 group of pixels in the $k^{th}$ layer $L_{in}(m, n, k)$, $L_{in}(m+1, n, k)$, $L_{in}(m, n+1, k)$, and $L_{in}(m+1, n+1, k)$, the output is Max$[L_{in}(m, n, k), L_{in}(m+1, n, k), L_{in}(m, n+1, k), L_{in}(m+1, n+1, k)]$. The advantage of pooling operations is that it discards fine feature information which is not of relevance to the task of feature identification. In this case, a pooling with 2×2 pooling tiles reduces the size of the downstream data by a factor of four.

The output of the pooling operation (805) is directed to a third convolution filter (806). As shown in line 6 of the Keras code provided above, the convolution has 64 feature maps (instead of 32 feature maps as the first and second convolutions (802) and (804) had) of size 3×3, a relu activation function Φ and the border mode is set to border_mode='same'. All other parameters of the third convolution (806) are the same as those in the second convolution (804). The output of the third convolution (806) is directed to a second Dropout instruction (807) as shown in line 7 of the Keras code, and so on with the Convolution2D instructions of lines 8, 10, 12, 15, 18, and 21 of the Keras code corresponding to process steps 808, 810, 812, 815, 818 and 821 of FIG. 8, the MaxPooling2D instructions of lines 9 and 13 of the Keras code corresponding to process steps 809 and 813 of FIG. 8, and the UpSampling2D instructions of lines 14, 17 and 20 corresponding to process steps 814, 817 and 820 of FIG. 8.

The output of the pooling operation (813), corresponding to line 13 of the Keras code, is directed to an up-sampling operation (814), corresponding to the UpSampling2D instruction on line 14 of the Keras code. Up-sampling is used to increase the number of data points. The size=(2,2) argument of the UpSampling2D instruction indicates that the up-sampling maps each pixel to a 2×2 array of pixels having the same value, i.e., increasing the size of the data by a factor of four. According to the present invention the convolution neural network (800) of the present invention maps an input image of N×N pixels to a categorized output image of N×N pixels, for instance representing areas to be operated on by pruning and/or harvesting. Since poolings reduce the size of the data, and convolutions reduce the size of the data when the number of feature maps is not too large, an operation such as up-sampling is therefore needed to increase the number of neurons to produce an output image of the same resolution as the input image.

Figure 10:
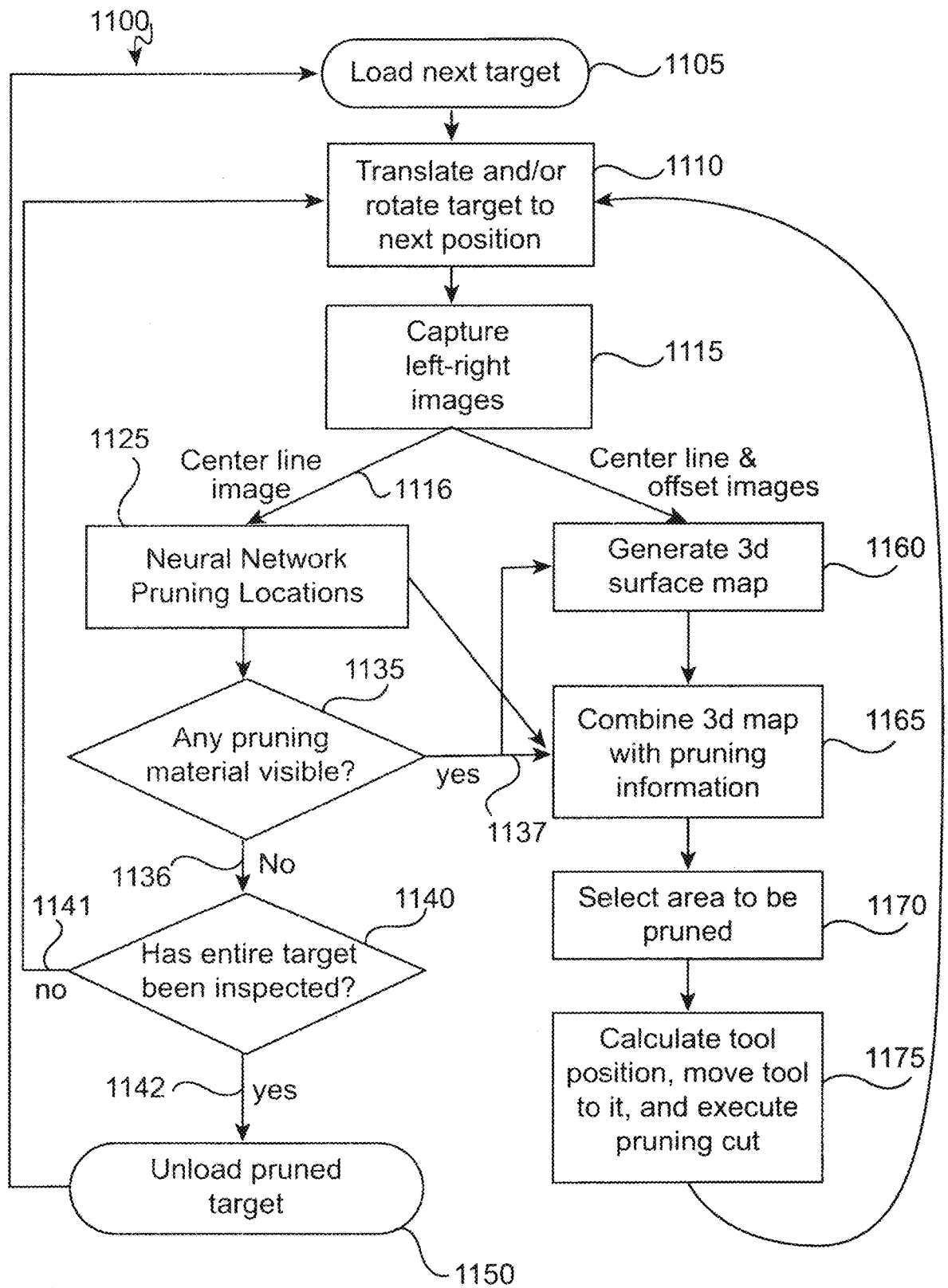
FIG. 10 is a flowchart of the process of pruning according to the present invention.

FIG. 10 shows the pruning process (1100) according to the preferred embodiment of the present invention. The process (1100) begins with the workpiece (or target) (100) being loaded (1105) in the workpiece positioner (1225) and translated and/or rotated into position (1110) for image capture (1115) using a stereoscopic camera (249). The stereoscopic camera which views the workpiece (100) has a left monoscopic camera (249a) and a right monoscopic camera (249b) as per FIG. 1. The left monoscopic camera (249a) is positioned and oriented so as to view directly down on the workpiece (100), i.e., the center of viewing of the left monoscopic camera (249a) is along the z' axis of FIG. 12A. The right monoscopic camera (249b) is positioned and oriented so as to view the workpiece (100) but to be slightly offset from viewing directly down on the workpiece (100). Conceptually and computationally it is advantageous to utilize a center-line image and an offset image rather than two offset images, in part because according to the preferred embodiment the neural network (800) utilizes data from a single image. Also as shown in FIG. 1, to each side of the stereoscopic camera (249) are lights (248) which are oriented to illuminate the workpiece (100) with white light. The stereoscopic camera (249) photographs the workpiece (100) to produce center-line and offset camera image data which is collected by an electric controller (250).

The center-line image data is fed to the neural network (800) of FIG. 8 and the Keras code provided above, and the neural network (800) utilizes that data to determine (1125) the pruning locations on the workpiece (100) necessary to remove low trichome-density areas. According to the present invention the system includes a threshold trichome density setting. Regions with a threshold trichome density below the threshold trichome density setting are regions to be pruned. A determination (1135) is then made as to whether there are any pruning areas visible. If not (1136), then a determination is made (1140) as to whether the entire workpiece (100) has been inspected. If so (1142), then the workpiece (100) is unloaded (1150) and a next workpiece (100) is loaded (1105). If the entire workpiece (100) has not been inspected (1141), then the workpiece (100) is translated and/or rotated to the next position (1110).

While only the center-line image is fed to the neural network (800) for determination of the pruning locations on a two-dimensional image, both the centerline and offset image data are used to generate (1160) a three-dimensional surface map. If the neural network (800) determines (1135) that pruning locations are visible (1137) on the workpiece (100), then the process flow continues with the combination (1165) of the three-dimensional surface map and the neural network-determined pruning locations. Areas to be pruned are selected (1170), and then the positions of the cutting tool (1000) necessary to perform the pruning operations are determined and the necessary cutting operations are performed (1175). Once the cutting operations have been performed (1175), the workpiece is translated or rotated (1110) to the next operations position. The rotation increment is the width of the swatch which the cutting tool (1000) can cut on the workpiece (100) (without rotation of the workpiece (100) by the workpiece positioner (1220)), which in the preferred embodiment is roughly 1 cm.

Figure 9A:
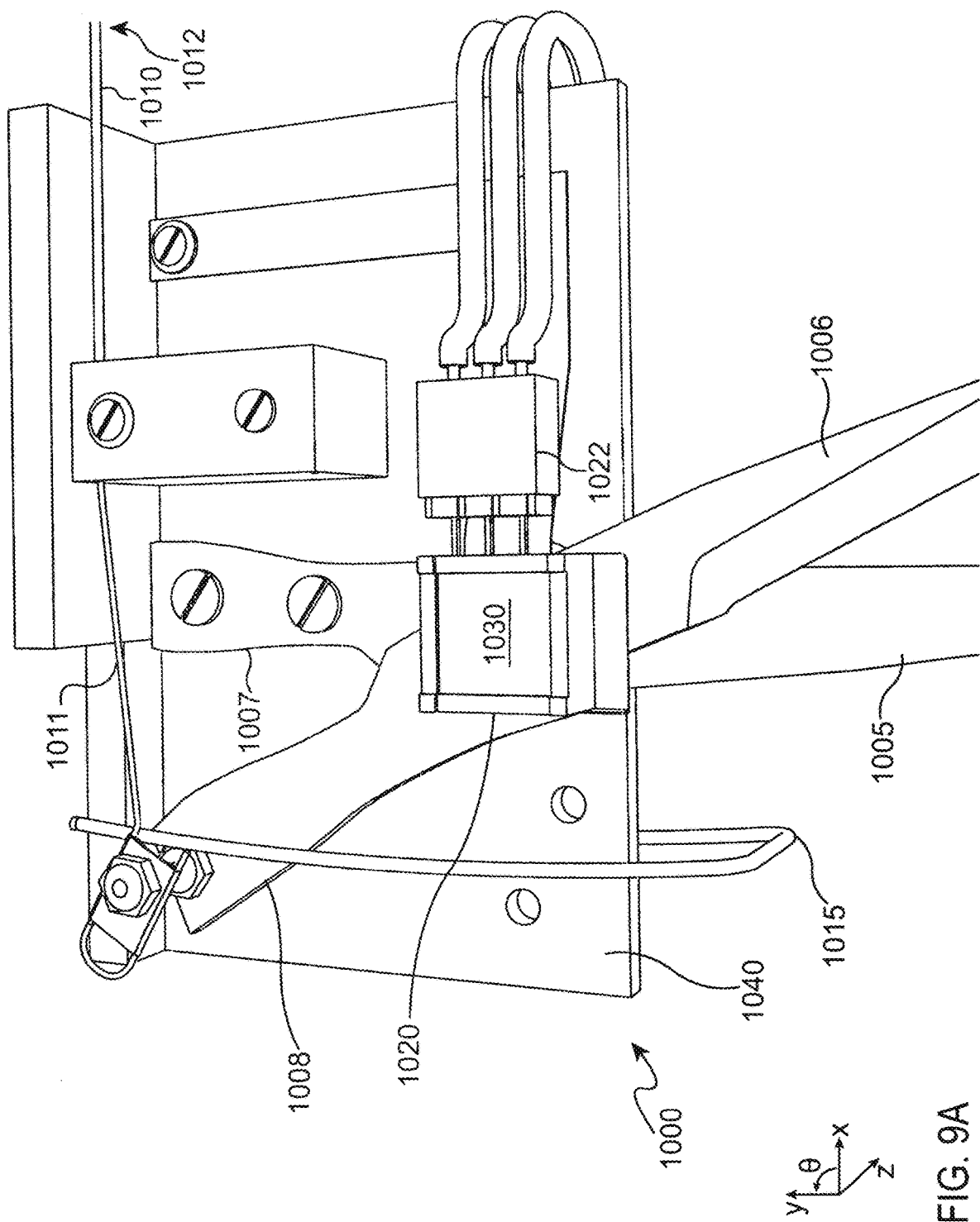
FIG. 9A shows a top view of a heated, spring-biased scissor-type cutting tool according to the present invention.
Figure 9B:
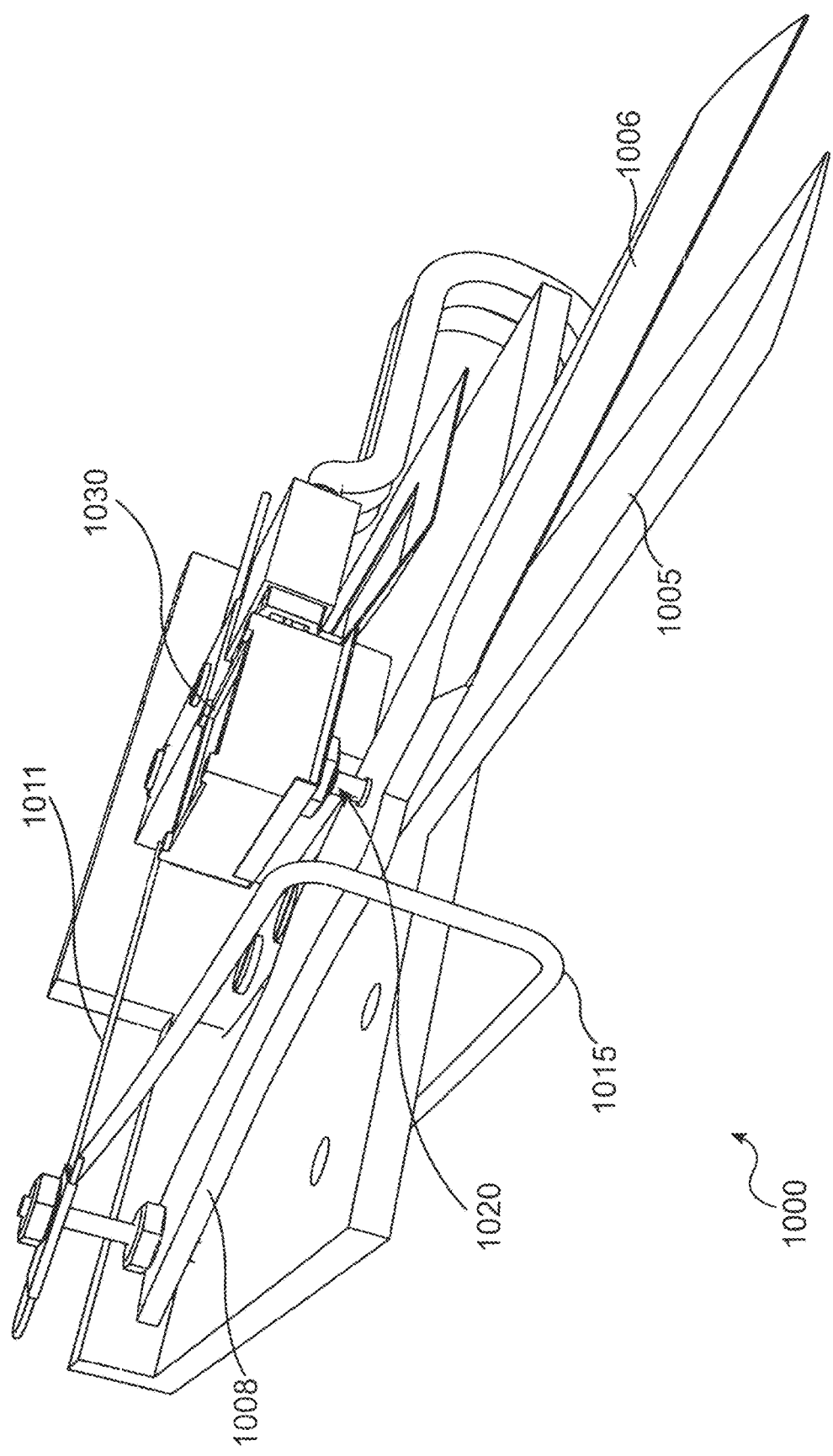
FIG. 9B shows a side view of the heated, spring-biased scissor-type cutting tool of FIG. 9A.
Figure 11:
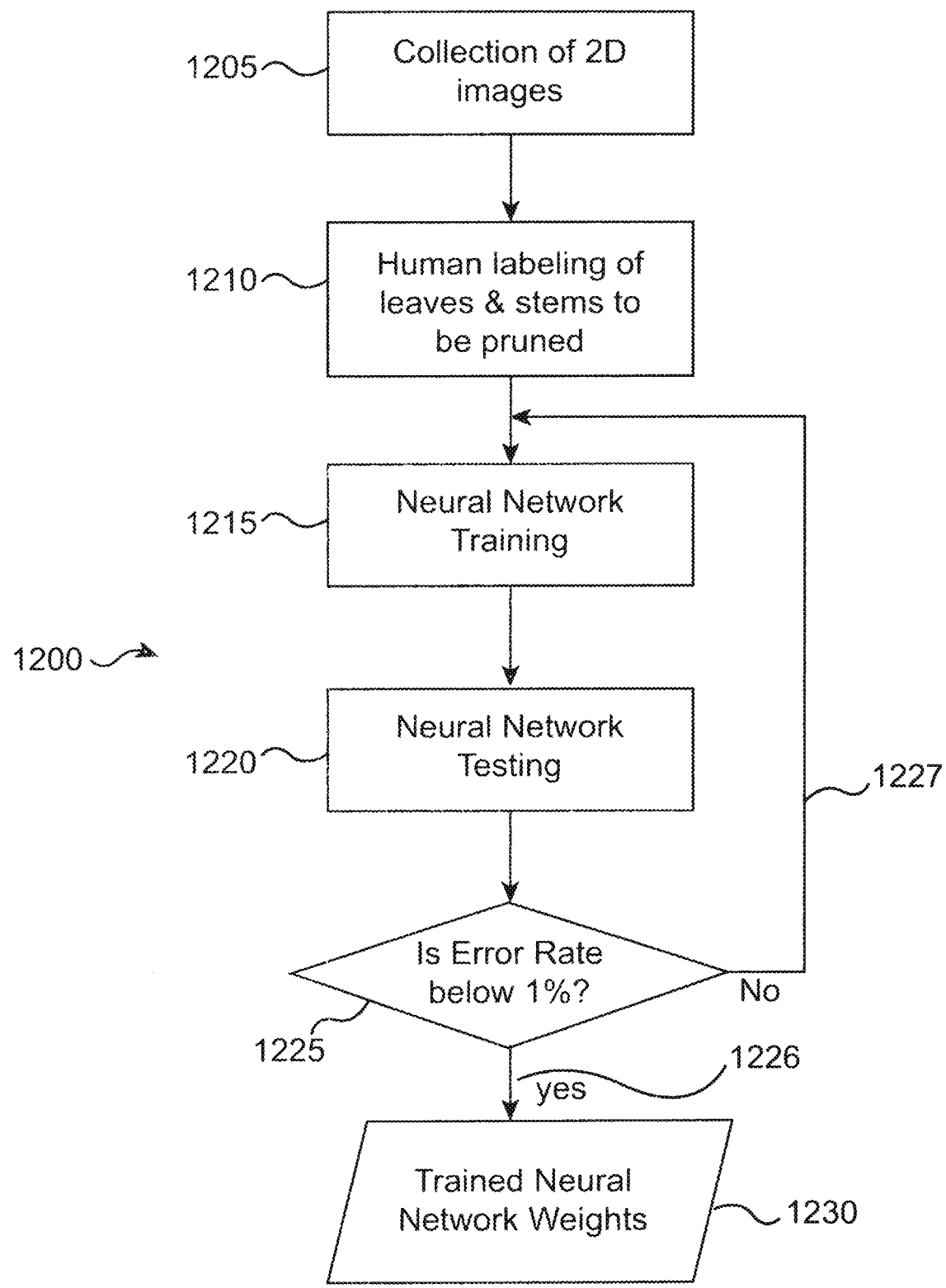
FIG. 11 shows a process of training of a convolution neural network according to the present invention.

FIG. 11 shows the process (1200) used to train the neural network (800) utilized in the pruning process (800) of FIG. 8. The process begins with the collection (1205) of two-dimensional images. As mentioned above, according to the preferred embodiment stereoscopic images are utilized by the method and apparatus, but only monoscopic images are used for the training of the neural network (800). The stereoscopic camera (249) photographs the workpiece (100) to produce camera image data which is collected (1205) by the electric controller (250). For each image, a human trainer identifies (1210) regions on the workpiece (100) to be pruned or otherwise operated on. For instance, FIG. 9A shows an image of a marijuana bud (100) and FIG. 9B shows the regions 101a through 101j (collectively or generically to be referred to with reference numeral 101) identified by a human operator as regions of low cannabinoid density, and therefore regions to be pruned. In particular, FIG. 7A shows a marijuana bud (100) where the right half has been trimmed of shade leaves, and regions (101) in the image of FIG. 7B correspond to locations of the shade leaves.

The regions (101) identified by the human trainer are fed to the neural network (800) for training (1215) of the neural network (800) (as is described above in conjunction with the description of supervised learning of the neural network (500) of FIG. 5). Utilizing the training information from the human trainer, the neural network (800) is trained (1215) using back propagation, as is well known in the art and described in detail in "Neural Networks for Pattern Recognition" by Christopher M. Bishop, Oxford University Press, England, 1995, which is incorporated herein by reference. Then neural network testing (1220) is performed by evaluating the error between the output generated by the neural network and the low-cannabinoid regions (101) identified by the human operator. If the error rate is below 1% (1226), then the neural network is considered to have converged sufficiently to be considered trained and the training process (1200) is complete (1230). If the neural network weights have not (1227) converged to produce an error rate of less than 1%, then the process (1200) returns to the neural network training step (1215) described above.

Figure 7C:
FIG. 7C shows an exemplary workpiece with many large shade and sugar leaves.
Figure 7D:
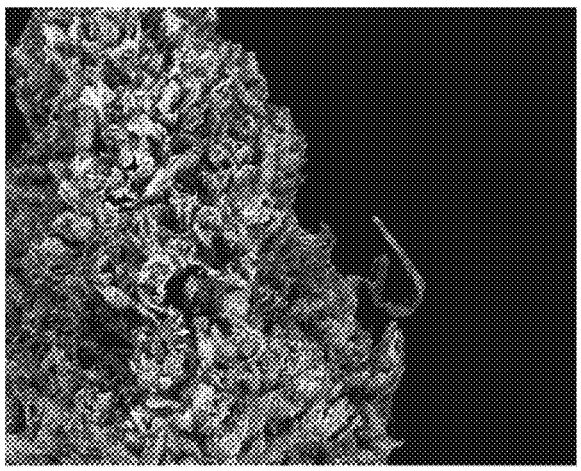
FIG. 7D shows an exemplary workpiece with smaller shade and sugar leaves than those of the workpiece of FIG. 7C.
Figure 7E:
FIG. 7E shows regions on the workpiece of FIG. 7C which have been identified by a convolution neural network as having a high density of trichomes as white.
Figure 7F:
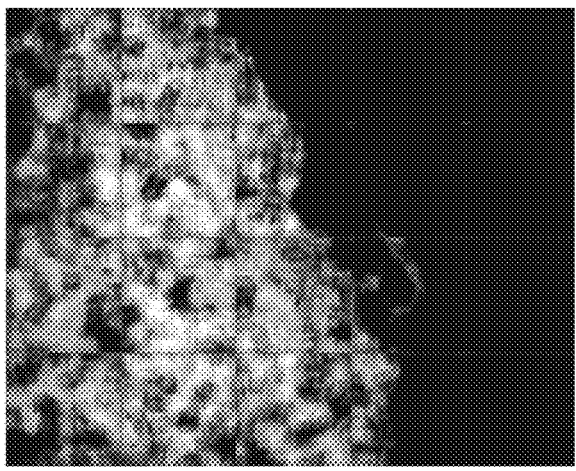
FIG. 7F shows regions on the workpiece of FIG. 7D which have been identified by a convolution neural network as having a high density of trichomes as white.
Figure 7G:
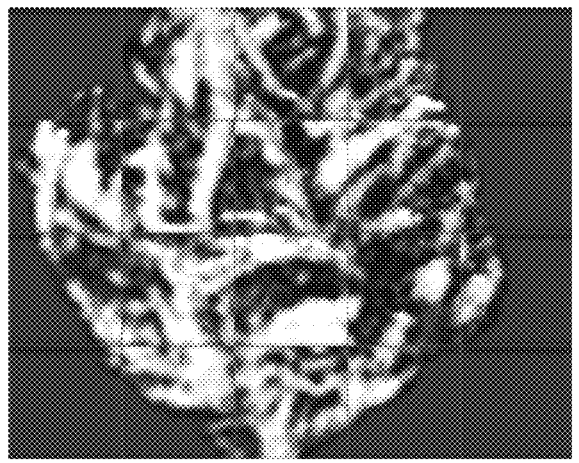
FIG. 7G shows regions on the workpiece of FIG. 7C which have been identified by a convolution neural network as having a low density of trichomes as white.
Figure 7H:
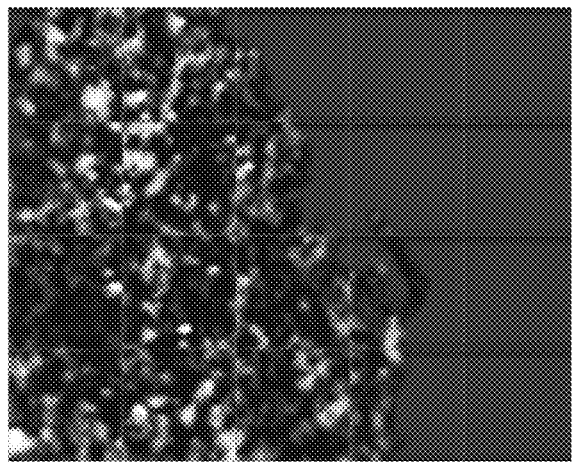
FIG. 7H shows regions on the workpiece of FIG. 7D which have been identified by a convolution neural network as having a low density of trichomes as white.

Images processed using this process (1200) are shown in FIGS. 7G and 7H. In particular, FIG. 7C shows an exemplary workpiece with many large shade and sugar leaves and FIG. 7D shows an exemplary workpiece with smaller shade and sugar leaves than those of the workpiece of FIG. 7C. Upon application of the above-described process (1200) upon the workpiece of FIG. 7C the image of FIG. 7G is produced. Similarly, upon application of the above-described process (1200) upon the workpiece of FIG. 7D the image of FIG. 7H is produced. As can be seen by comparison of FIG. 7C with FIG. 7G and comparison of FIG. 7D with FIG. 7H, the process (1200) has successfully produced images with white regions where the shade and sugar leaves are located.

Similarly, using a neural network of the specifications described above which is however trained to locate high trichome density regions, the image of FIG. 7E is generated from the image of FIG. 7C and the image of FIG. 7F is generated from the image of FIG. 7D. Inspection shows that FIG. 7E is roughly the complement to FIG. 7G, and FIG. 7F is roughly the complement to FIG. 7H. It should be noted that FIGS. 7E and 7F are presented herein for instructional purposes and according to the preferred embodiment of the present invention only regions of low trichome density are located by the neural network (800).

Figure 12A:
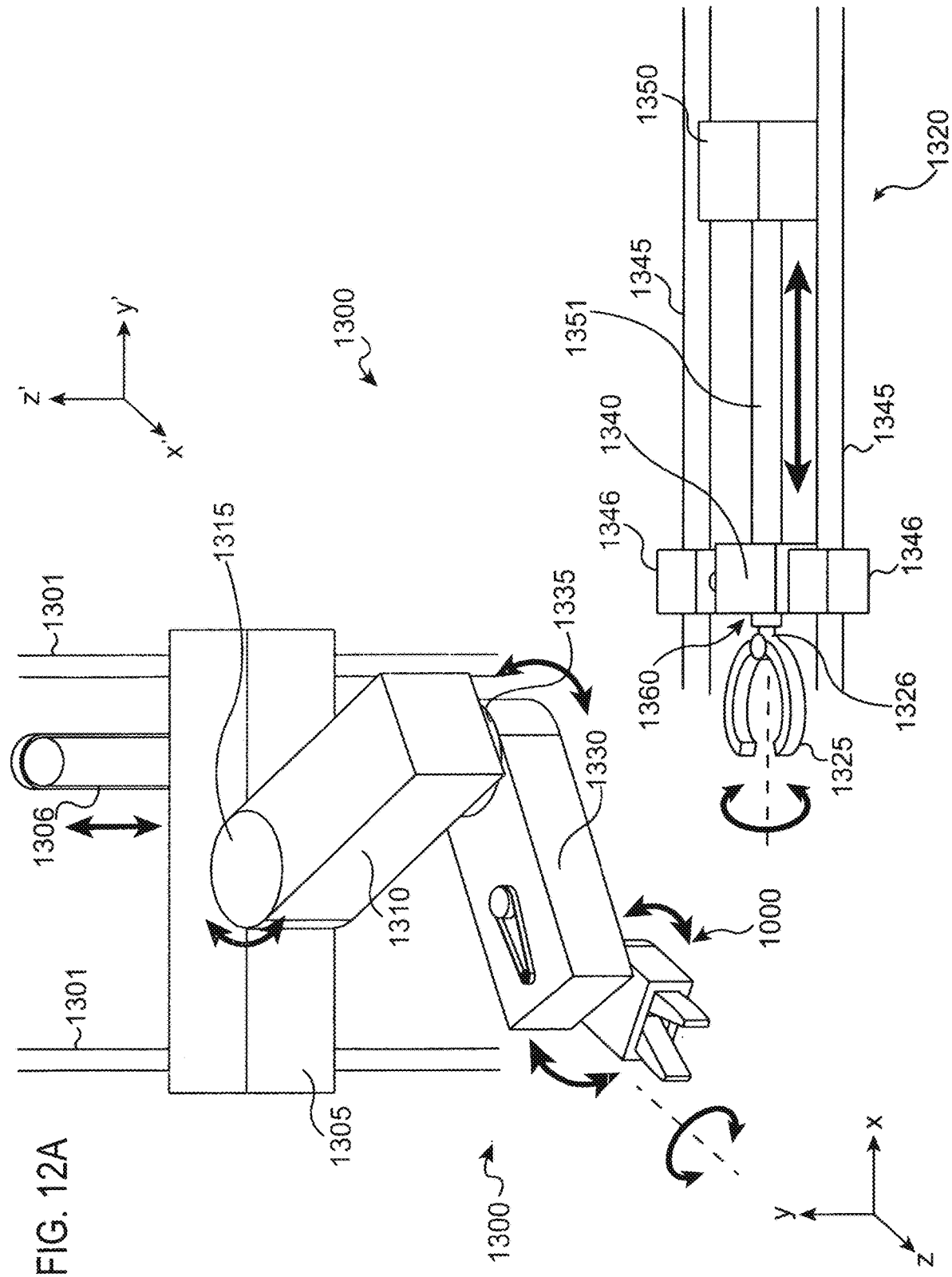
FIG. 12A shows an alternate embodiment of a cutting tool positioning and workpiece positioning apparatus according to the present invention.

FIG. 12A shows a mechanical system (1300) for control of the cutting tool (1000) and workpiece (not visible in FIG. 12A but for the sake of consistency to be referred to with the reference numeral "100") where the cutting tool (1000) can cut at any location on the workpiece (100) and at any angle. The electronic control system for operation of the mechanical system (1300) is not visible in FIG. 12A, but such electronic control systems are well-known in the art of electronic control of stepper motors, brushless direct-current electric motors, brushed direct-current electric motors, servo motors, etc. The position and orientation of the cutting tool (1000) is controlled by a cutting tool control system the mechanical portion of which includes a pair of vertical slide bars (1301) on which a chassis bar (1305) may be slideably positioned along the z' axis (according to the coordinate system shown at the top left). Motion of the chassis bar (1305) is produced by a stepper motor (not shown) connected to a control belt (1306) which is in turn connected to the chassis bar (1305). An inner arm (1310) is attached to the chassis bar (1305) via a first rotation mount (1315) which allows rotation of the inner arm (1310) in the x'-y' plane. The inner arm (1310) is attached to an outer arm (1330) via a second rotation mount (1335) which allows rotation of the outer arm (1310) relative to the inner arm (1310) in the x'-y' plane. According to the coordinate system shown next to the cutting tool (1000) in FIG. 12A, which corresponds to the coordinate system shown next to the cutting tool (1000) in FIG. 9A, the cutting tool is rotatable about the z axis and can be pivoted in the y-z plane and the x-y plane. Preferably, the motors (not shown in FIG. 12A) used to control the positions/orientations of the chassis bar (1305), inner arm (1310), outer arm (1330), and cutting tool (1000) are brushless direct-current (BLCD) motors due to their speed.

The workpiece (100) is gripped by a grip mechanism (1325) on the workpiece positioning mechanism (1320). Generally, the workpiece (100) will have a longitudinal axis oriented along the y direction. The grip mechanism (1325) is mounted on and controlled by a grip control unit (1340). The grip control unit (1340) can rotate the grip mechanism (1325) about the y' axis. The grip control unit (1340) is attached to two positioning rafts (1346) which are slideable in the +y and −y directions on grip positioning bars (1345), and grip positioning mechanism (1350) controls the position of the grip control unit (1340) along the y' axis via positioning rod (1351). Preferably, the motors (not shown in FIGS. 12A and 12B) used in the grip control unit (1340) and the grip positioning mechanism (1350) are brushless direct-current (BLDC) motors due to their speed.

Figure 12B:
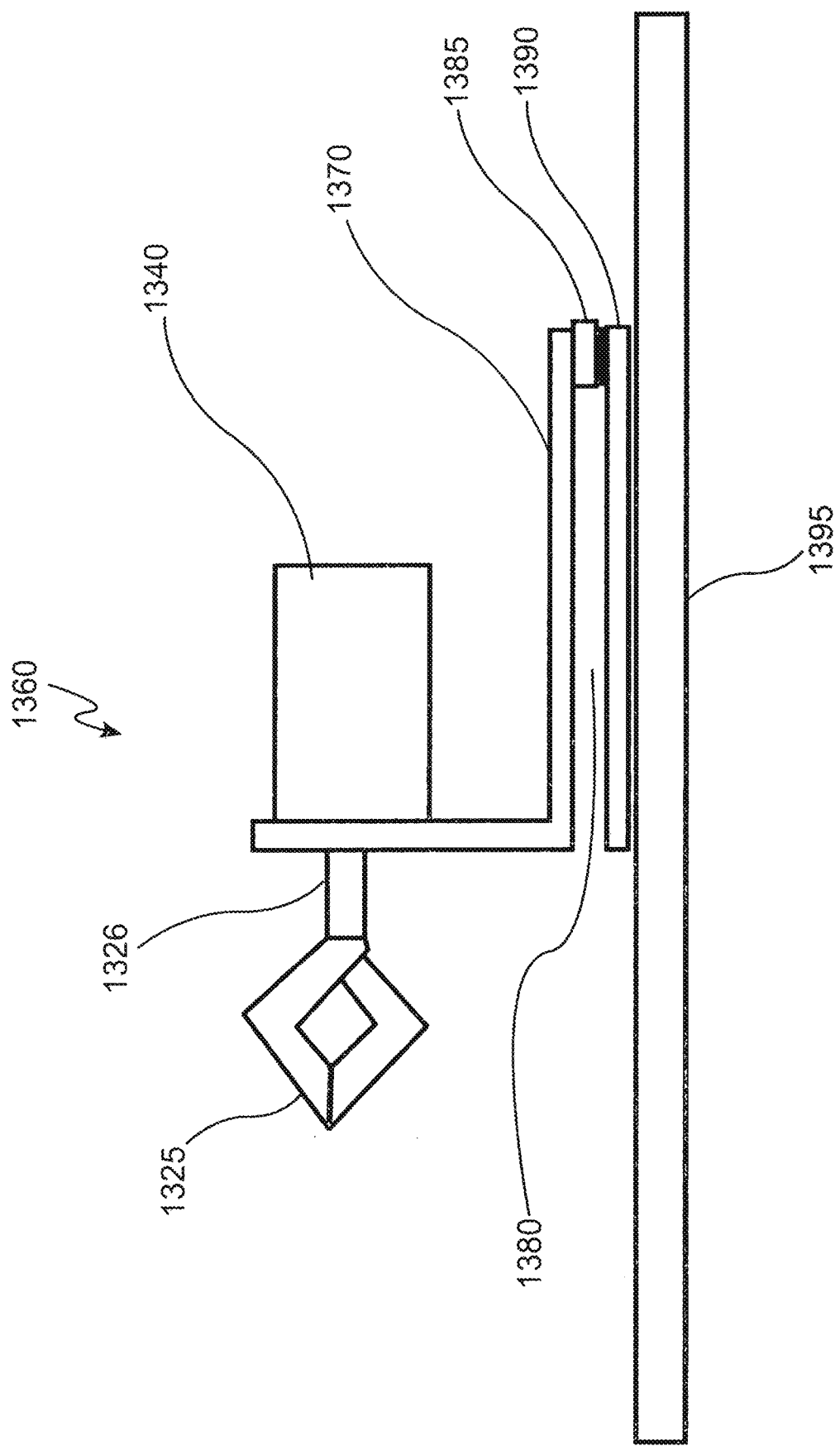
FIG. 12B is a schematic cross-sectional view of the carriage unit for the grip mechanism.

FIG. 12B is a schematic side view of the carriage assembly (1360) for the mechanical grip mechanism (1325). The mechanical grip mechanism (1325) is connected to the grip control unit (1340) via a control shaft (1326). The grip control unit (1340) is mounted on a mounting bracket (1370), and the mounting bracket (1370) is affixed to a mounting plate (1390) via a spacer (1385). The spacer (1385) provides play in the mounting bracket (1370) due to the flexibility of the material of the mounting bracket. A pressure sensor (1380) located under the end of the bracket (1370) on which the grip control unit (1340) is mounted therefore can measure vertical force applied to the grip mechanism (1325), such as via the workpiece (100) (not shown in FIG. 12B). The mounting plate (1390) is in turn mounted on a moveable base (1395).

Although not depicted in FIG. 12A, the apparatus includes a stereoscopic camera (249). Preferably, the stereoscopic camera (249) is located directly above the workpiece (100), or the optical path is manipulated, so that one lens provides a center-line image and the other lens provides an offset image. According to the preferred embodiment of the present invention the lenses of the stereoscopic camera (249) have physical apertures (rather than effective apertures that are created electronically), so the aperture can be made small enough to provide a depth of field of 5 to 10 cm at a range on the order of 1 meter. (Effective apertures created electronically generally have a depth of field of roughly 0.5 cm at a range on the order of 1 meter.)

Figure 9C:
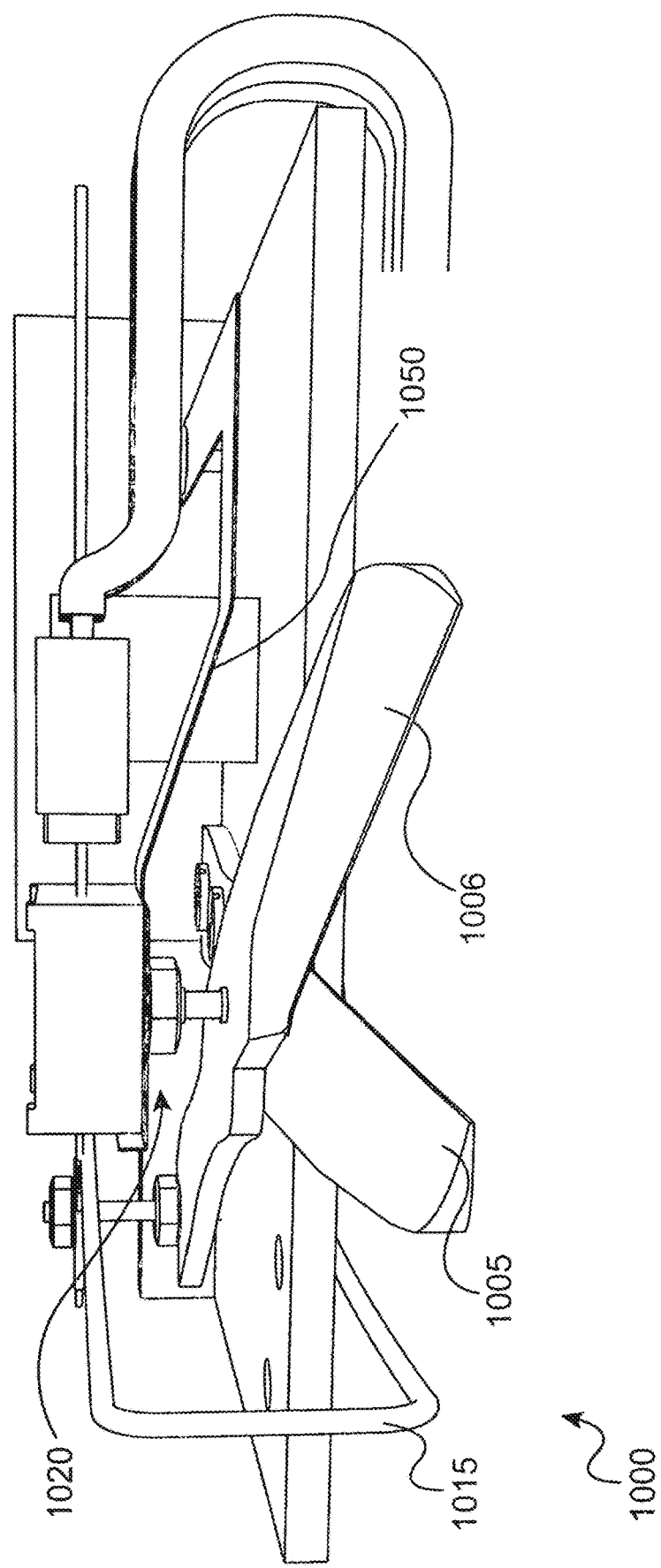
FIG. 9C shows a front view of the heated, spring-biased scissor-type cutting tool of FIG. 9A.

For resinous plants, such as marijuana, pruning using a scissor-type tool can be problematic because resins accumulate on the blades and pivoting mechanism, adversely affecting operation and performance of the tool. According to the preferred embodiment of the present invention, the pruning tool is a heated, spring-biased scissor-type cutting tool. FIGS. 9A, 9B and 9C show a top view, side view, and front view, respectively, of a heated, spring-biased scissor-type cutting tool (1000) according to a preferred embodiment of the present invention. The pruning tool (1000) has a fixed blade (1005) and a pivoting blade (1006). The fixed blade (1005) is integrally formed with a fixed arm (1007), and the pivoting blade (1006) is integrally formed with a pivoting arm (1008) of the tool (1000). The fixed blade (1005)/fixed arm (1007) is secured to a base plate (1040). The pivoting blade (1006)/pivoting arm (1008) is rotatable on a pivot mechanism (1020) having two nuts (1021) and (1022) mounted on a pivot screw (not visible in the figures). Mounted at the top of the pivot screw is a potentiometer (1030), the control dial (not visible) of the potentiometer (1030) being attached to the pivot screw such that rotation of the pivoting blade (1006) causes rotation of the pivot screw and the control dial of the potentiometer (1020). The resistance of the potentiometer (1020)—as controlled by the control dial—is detected via electrical leads (1022) so that the position of the pivoting blade (1006) can be monitored. The end of the pivoting arm (1008) distal the pivot (1020) is connected to the control cable (1011) of a Bowden cable (1012). The housing (1010) of the Bowden cable (1012) is visible extending rightwards from the cutting tool (1000).

As is generally the case with scissor-type cutting tools, the roughly-planar faces of the blades (1005) and (1006) have a slight curvature (not visible in the figures). In particular, with reference to FIG. 9B, the downwards-facing face of the pivoting blade (1006) arcs from the pivot end to the end which is distal the pivot (1020) so that it is concave downwards, and the upwards-facing face of fixed blade (1005) arcs from the pivot end to the end which is distal the pivot (1020) so that it is concave upwards. These curvatures help insure good contact between the cutting edges of the blades (1005) and (1006) so that the tool (1000) cuts well along the entire lengths of the blades (1005) and (1006).

Attached to the base plate (1040) and connected to the pivoting arm (1008) is a bias spring (1015). According to the preferred embodiment, the bias spring (1015) is a formed wire which, at a first end, extends from the base plate (1040) in roughly the +z direction and has a U-shaped bend such that the second end of the bias spring (1015) is proximate the outside end of the pivoting arm (1008). The bias spring (1015) biases the pivoting arm (1008) upwards and such that the pivoting arm (1005) is rotated away from fixed blade (1006), i.e., such that the cutting tool (1006) is in the open position. The play in the blades (1005) and (1006) provided by the pivot (1020) necessitates that the potentiometer (1030) be able to shift somewhat along the x and y directions, and rotate somewhat along the θ and φ directions. This play is provided by flexible mounting rod (1060) which is secured to and extends between the base plate (1040) and the potentiometer (1020).

The base plate (1040) is heated by a Peltier heater (not visible in the figures) secured to the bottom of the base plate (1040). The gel point of a polymer or polymer mixture is the temperature below which the polymer chains bond together (either physically or chemically) such that at least one very large molecule extends across the sample. Above the gel point, polymers have a viscosity which generally decreases with temperature. Operation of the cutting tool (1000) at temperatures somewhat below the gel point is problematic because the resin will eventually accumulate along the blades (1005) and (1006) and in the pivot (1020) to an extent to make the tool (1000) inoperable. Cannabis resin is a complex mixture of cannabinoids, terpenes, and waxes which varies from variety to variety of plant, and hence the gel point will vary by a few degrees from variety to variety of plant. According to the preferred embodiment of the present invention, the tool (1000) is heated to at least the gel point of the resin of the plant being trimmed. Furthermore, with v(T) being the viscosity v as a function of temperature T, and $T_{gp}$ is the gel point temperature, preferably the tool is heated to a temperature such that $v(T)<0.9\ v(T_{gp})$, more preferably $v(T)<0.8\ v(T_{gp})$, and still more preferably $v(T)<0.7\ v(T_{gp})$. For cannabis, the tool (1000) is heated to a temperature of at least 32° C., more preferably the tool (1000) is heated to a temperature between 33° C. and 36° C., and still preferably the tool (1000) is heated to a temperature between 34° C. and 35° C.

According to an alternate embodiment of the present invention, the Peltier module is used for cooling, rather than heating, of the blades (1005) and (1006) of the cutting tool (1000). In particular, the Peltier module cools the blades (1005) and (1006) of the cutting tool (1000) to a temperature slightly above the dew point of water. Since resin becomes less sticky as its temperature decreases, the low temperature makes resin accumulation on the blades (1005) and (1006) less problematic. According to this preferred embodiment the control system for the Peltier module utilizes atmospheric humidity information to determine the temperature to which the blades (1005) and (1006) are to be cooled. Preferably, the blades (1005) and (1006) are cooled to a temperature below the wetting temperature of resin on the metal of the blades (1005) and (1006) and above the dew point of the moisture present in the atmosphere of the apparatus so that the resin does not flow into the pivot mechanism (1020).

Figure 13:
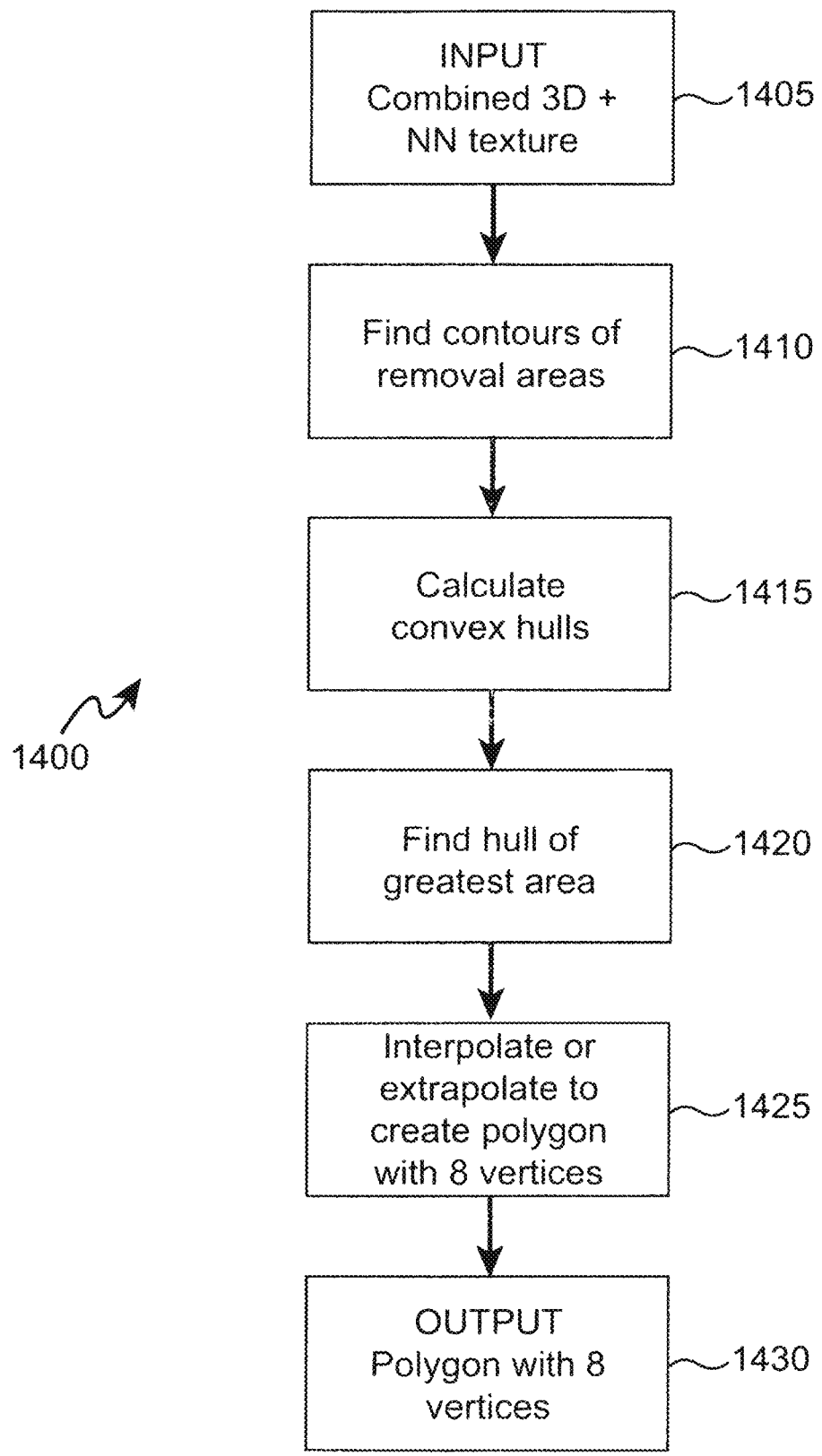
FIG. 13 is a flow chart showing the process of creating convex polygon hulls on the image according to the present invention.

Once the neural network (800) described above with reference to FIG. 8 determines regions of low trichome density, convex hulls (650) (as described above in reference to FIGS. 6A and 6B) are generated around regions of low trichome density according to the process (1400) shown in FIG. 13. The process (1400) utilizes the three-dimensional surface contour (1405) of the workpiece (100) determined by a depth analysis of the stereoscopic images from the stereoscopic camera (249), in combination with the determinations of trichome density produced by the neural network (800) (such as the grey-scale images of FIGS. 7G and 7H). The grey-scale data is thresholded according to a user-controlled threshold, to create low trichome area contours (1410). The contours are converted (1415) into convex hulls (650), such as the convex hulls (650) shown in FIGS. 6A and 6B and described above. A set of points is said to be "convex" if it contains all the line segments connecting each pair of its points. The vertices of the convex hulls (650) are the vertices of the exterior line segments of the convex set. The convex hulls (650) are stored as hierarchical linked lists of vertices and for each convex hull (650) the enclosed area (based on a set of triangles spanning the vertices as per a Delvaney transform) of the convex hull (650) is computed. The convex hull (650) of greatest area which has not been processed is then found (1420) and for that convex hull (650) the number of vertices is converted (1425) to eight since (i) eight vertices can sufficiently well approximate convex polygons for the purpose of the present invention and (ii) for standard neural networks a fixed number of input points are required. If prior to conversion (1425) a convex hull (650) has more than eight vertices, then adjacent triplets of vertices are analyzed and center vertices of triplets which are most co-linear are discarded until there are eight vertices. If prior to conversion (1425) a convex hull (650) has less than eight vertices, then vertices are added between adjacent pairs of vertices which are separated by the greatest distance.

Figure 14:
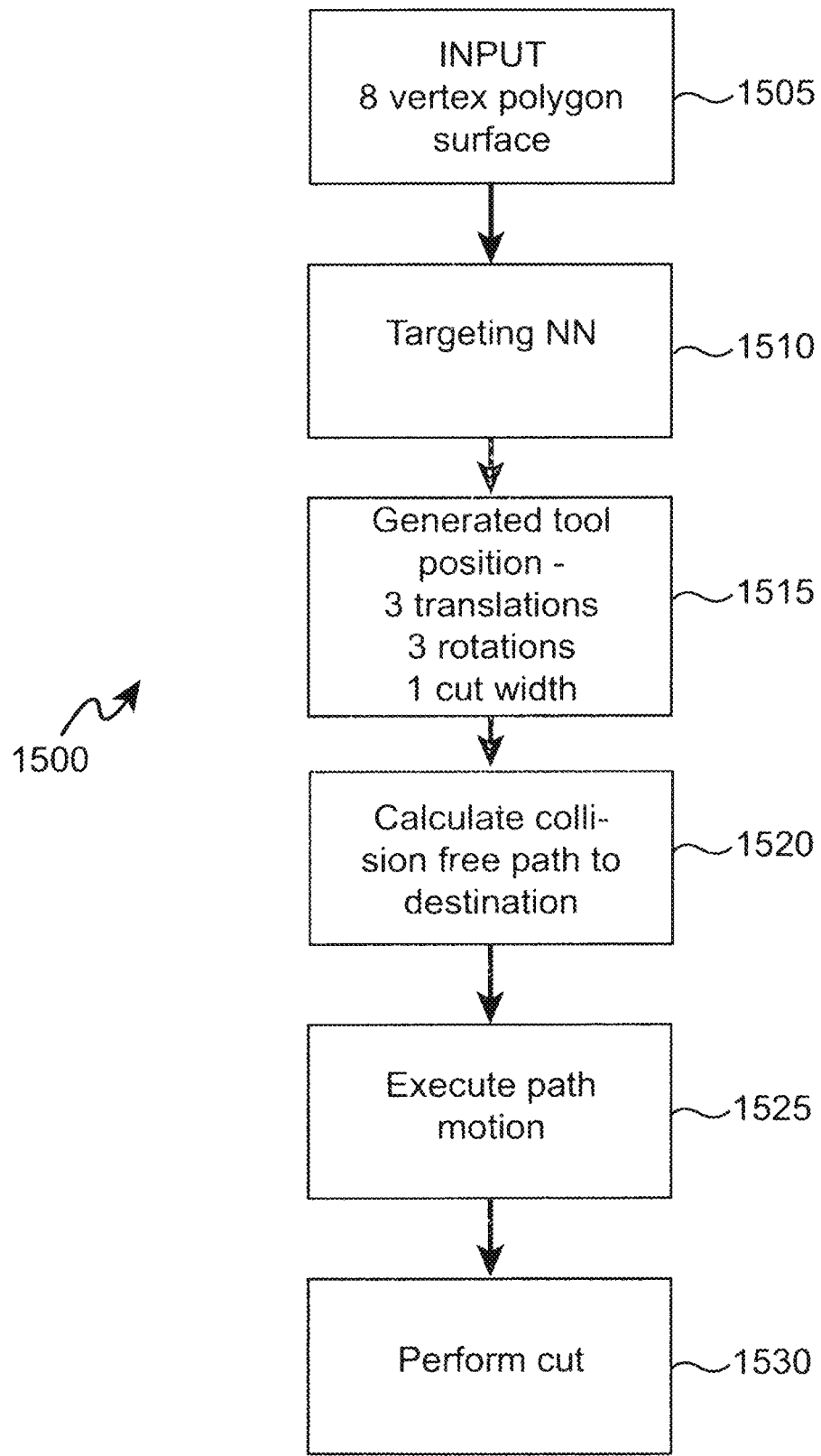
FIG. 14 is a flow chart showing the process of performing cuts on the workpiece according to the present invention.

The eight-vertex convex hull output (1430) provided by the process of FIG. 13 is used as the input (1505) of the process (1500) shown in FIG. 14 for calculating and executing the tool positioning required to cut the foliage corresponding to the convex hull (650). The eight-vertex convex hull input (1505) is fed (1510) as eight 32-bit (x, y, z) coordinates to a tool-operation neural network which generates (1515) the tool position, the tool orientation, the distance between the tips of the blades (1005) and (1006) of the scissor-type cutting tool (1000), and the pressure applied by the blades (1005) and (1006) to the workpiece (100) (in the case of a "surface cut") required to make a cut to remove the foliage corresponding to the eight-vertex convex hull (650). Keras code for a neural network used for the tool operation (1175) according to the present invention is provided below (with line numbers provided for ease of reference):

```
image_h=8*3
image_v=1
input_img=Input(shape=(1, image_h, image_v))
x=Convolution2D(32, 3, 1, input_shape=(1, image_h, image_v), activation='relu', border_mode='same', init='uniform')(input_img)
x=Dropout(0.2)(x)
x=Convolution2D(32, 3, 1, activation='relu', border_mode='same')(x)
x=MaxPooling2D(pool_size=(2, 1))(x)
x=Convolution2D(64, 3, 1, activation='relu', border_mode='same')(x)
x=Dropout(0.2)(x)
x=Convolution2D(64, 3, 1, activation='relu', border_mode='same')(x)
x=MaxPooling2D(pool_size=(2, 1))(x)
x=Convolution2D(128, 3, 1, activation='relu', border_mode='same')(x)
x=Dropout(0.2)(x)
x=Convolution2D(128, 3, 1, activation='relu', border_mode='same')(x)
x=MaxPooling2D(pool_size=(2, 1))(x)
x=UpSampling2D(size=(2, 1))(x)
x=Convolution2D(64, 3, 1, activation='relu', border_mode='same')(x)
x=Dropout(0.2)(x)
x=UpSampling2D(size=(2, 1))(x)
x=Convolution2D(32, 3, 1, activation='relu', border_mode='same')(x)
x=Dropout(0.2)(x)
x=UpSampling2D(size=(2, 1))(x)
x=Convolution2D(1, 3, 1, activation='relu', border_mode='same')(x)
```

This neural network uses the same types of operations, namely Convolution2D, Dropout, MaxPooling2D, and UpSampling2D, as used above in the neural network (800) shown in FIG. 8. However, the input data, rather than being an image, is the eight three-dimensional coordinates which form the vertices of a convex hull (650). Hence image_h is set to a value of 24 and, since the data according to the present invention is processed as a vector, image_v is set to 1. It should be noted that the "2D" moniker in the Convolution2D, MaxPooling2D, and UpSampling2D operations are therefore somewhat misleading—the processing is a one-dimensional special case since image_v has been set to 1. Since the data is processed as a vector the feature maps of the Convolution2D operations are vector 3×1 feature maps. The neural network is human trained with pruning operations and the output of this neural network is three position coordinates (i.e., the (x, y, z) coordinates) of the cutting tool (1000), three angular orientation coordinates of the cutting tool (1000), the width the blades (1005) and (1006) of the cutting tool (1000) are to be opened for the pruning operation (1175), and the pressure to be applied by the cutting tool (1000) to the workpiece (100). Controlling the width of the blades (1005) and (1006) needed for cutting is useful in accessing foliage in crevices. The pressure is a useful parameter to monitor and control since this allows the cutting tool to perform "glancing" cuts where the cutting tool (1000) is oriented so that the blades (1005) and (1006) of the cutting tool (1000) rotate in a plane parallel to a surface plane of the workpiece (100). Then the blades (1005) and (1006) may be pressed against the workpiece (100) with pressure such that foliage protrudes through the blades (1005) and (1006) along a length of the blades (1005) and (1006). This is advantageous since glancing cuts are the most efficient way to prune some types of foliage.

Then using calculations well-known in the art of automated positioning, a collision-free path from the current position of the cutting tool (1000) to the position necessary to cut the foliage corresponding to the eight-vertex convex hull (650) is calculated. The cutting tool (1000) is then moved (1525) along the collision-free path and oriented and opened as per determination step (1515), and the cut is performed (1530). If foliage corresponding to all convex hulls (650) above a cut-off size have been pruned, then the pruning process is complete. However, if foliage corresponding to convex hulls (650) above the cut-off size remain, then the process returns to step (1420) to find the largest convex hull (650) corresponding to foliage which has not been pruned, and the process continues with steps (1425), (1430), (1505), (1510), (1515), (1520), (1525) and (1530) as described above.

An Alternative Preferred Embodiment

Figure 15:
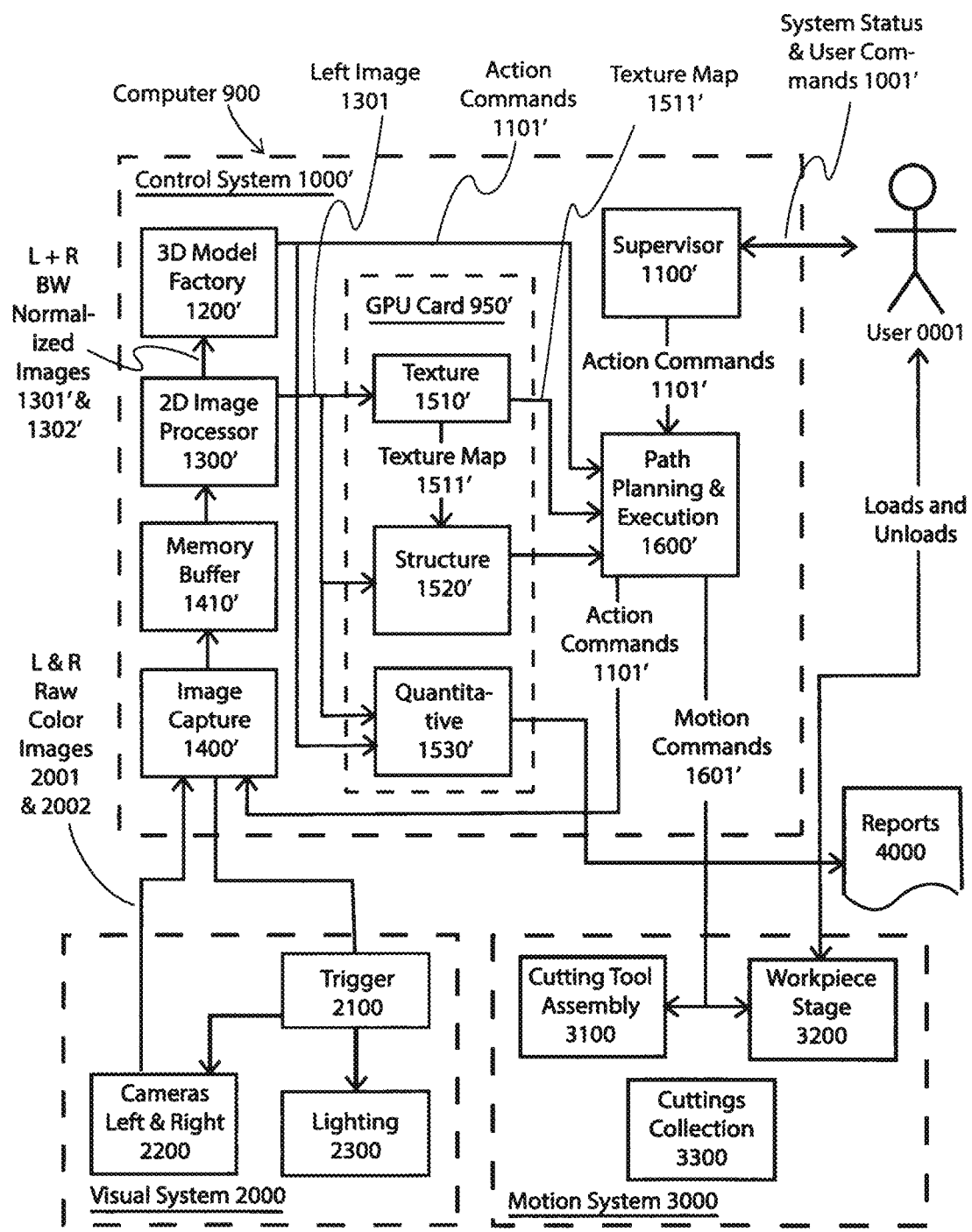
FIG. 15 is a schematic block diagram of an alternate embodiment of the present invention.

An alternative preferred embodiment of the present invention is shown in FIGS. 15 to 25. As shown in FIG. 15, it is composed of three systems: Control, Visual and Motion. The control system (1000') takes images from the visual system (2000) and processes a pair of 2D images to produce commands that directs the motion system (3000) to move a cutting tool assembly (3100) and a workpiece stage (3200) in order to remove and collect unwanted portions of the cannabis flower workpiece (3290).

A particular challenge associated with the process of the trimming of cannabis flowers is that the morphology of cannabis flowers is more diverse than the morphology of possibly any other crop. Ways in which this manifests as a challenge is in the securing of a workpiece (3290) by the gripper (3240) and in orienting a workpiece (3290) when secured in the gripper (3240). The gripper (3240) of the present invention provides the important advantages that cannabis flowers (3290) having a wide range of sizes and shapes can be secured by the gripper (3240), and furthermore that cannabis flowers (3290) having a wide range of sizes and shapes can be secured by the gripper (3240) over a range of orientations. Therefore, the gripper of the present invention allows the user to make a judgment regarding the most suitable orientation of the workpiece (3290) and to successfully orient the workpiece (3290) in the gripper (3240) with that orientation. The gripper (3240) of the present invention will easily secure workpieces (3290) with a short or long stem, workpieces (3290) which flare in size slowly or rapidly as a function of distance from the stem, etc.

The control system (1000') is embodied in electronic hardware that is currently, but not limited to, a standard PC computer with a graphic processing unit (GPU) card (950). The control system (1000') is connected to the motion system (3000) and visual system (2000) via USB connections. Its inputs consist of images from the visual system (2000) and workpiece data (3201) from the workpiece stage (3200). The control system (1000') outputs commands motion commands (1601') to the motion system (3000) and sync signals (1401') to the vision system (2000).

The supervisor (1100') software starts by taking a start command (1001') input from the user and generates signals to load, trim and unload a workpiece (3290). The trimming of a single workpiece (3290) begins by moving the workpiece stage (3200) to a position accessible to the user, who then inserts a cannabis flower (i.e., workpiece (3290)) into the gripper (3240). The supervisor (1100') then moves the workpiece (3290) into the work volume (5000). Then the supervisor (1100') repeatedly does a loop of: capture images, process images, do modeling & analysis, prepare motion commands, execute commands to trim the current side of the workpiece (3290) visible to the vision system (2000). Then the supervisor rotates the workpiece (3290), by sending motion commands to the roll actuator (3230) to expose the next untrimmed side of the workpiece (3290) to the vision system (2000). This loop is repeated until the workpiece (3290) is trimmed. Then the supervisor (1100') moves the workpiece (3290) out of the work volume (5000) to a point accessible to the user (0001) who then removes the finished workpiece (3290), and then inserts a new untrimmed workpiece and the process repeats until the user commands the supervisor (1100') to stop or an error of some kind occurs.

The image capture section (1400') consists of a USB 3.0 interface and manufacturer's driver software. The image capture section (1400') sends configuration data such as image size, image depth, exposure, sharpness, black level and control instructions (1401') and receives 24 bit color images (2001 and 2002) from the cameras (2210 and 2220). The image capture section (1400') writes those images (2001 and 2002) in a memory buffer (1410') that is then read by the 2D image processor (1300').

The 2D image processor (1300') enhances each of the 24 bit color images (2001 and 2002) from the image capture buffers (1410') separately. The operations performed on the incoming raw images include: normalization, thresholding and masking to remove areas of no interest such as background noise. Normalization is the process of modifying a pixels brightness so that the total range of brightness in an image is of a certain chosen value in order to make images captured under varying conditions more similar. Thresholding is the process of setting a pixels's brightness to zero whenever it is below a certain chosen threshold. Masking is the setting a selected areas's brightnes to zero. It also produces a pair of 16 bit normalized black and white images (1301') and (1302') that are used by the 3D model factory (1200').

The 3D model factory (1200') takes the normalized black and white ("BW") left and right ("L+R") images (1301') and (1302') from the 2D image processor (1300') and uses the well known semi-global bit matching (SGBM) stereo algorithm [1] running on the GPU (950) to produce a disparity map image (1201') that has at each pixel a 8 bit or 16 bit unsigned number that represents the scaled distance, plus an arbitrary offset, from the focal plane of the left camera (2210). The depth mapping of the disparity map (1201') is used by the analysis (1500') and path planning & execution (1600') units.

The analysis subsystem (1500') provides a texture map (1511') and an list of the regions of interest (RIO list) (1521') to a path planning & execution unit (1600') in order to perform the trimming of the workpiece (3290) and generates reports (4000) to the user (0001) on the quantity and quality of the process/product.

The texture analysis unit (1510) takes the processed 2D BW left image (1301') and uses a convolution neural network (CNN), running on a GPU card (950'), to generate a texture map (1511') whose intensity at each point is proportional to that pixel's probability of belonging to a certain texture. Those textures representing the major morphological components of the cannabis flower's structure: stem, shade leaf, sugar leaf and nugget.

The structure unit (1520') takes the processed 2D BW left image (1301) and uses a Classifier Neural Network, running on a GPU (950'), to identify regions having target textures and store these areas in a regions of interest ("ROI") list (1521').

The quantitative module (1530') produces reports (4000) about the process and product. Process reports (4000) provide data including but are not limited to: quantity of cannabis flowers (workpieces) processed in a given time, machine performance, and status. Product data and reports include but are not limited to: weight, volume, relative trichome density, water content and presence and location of contaminants such as powdery mildew.

Figure 20:
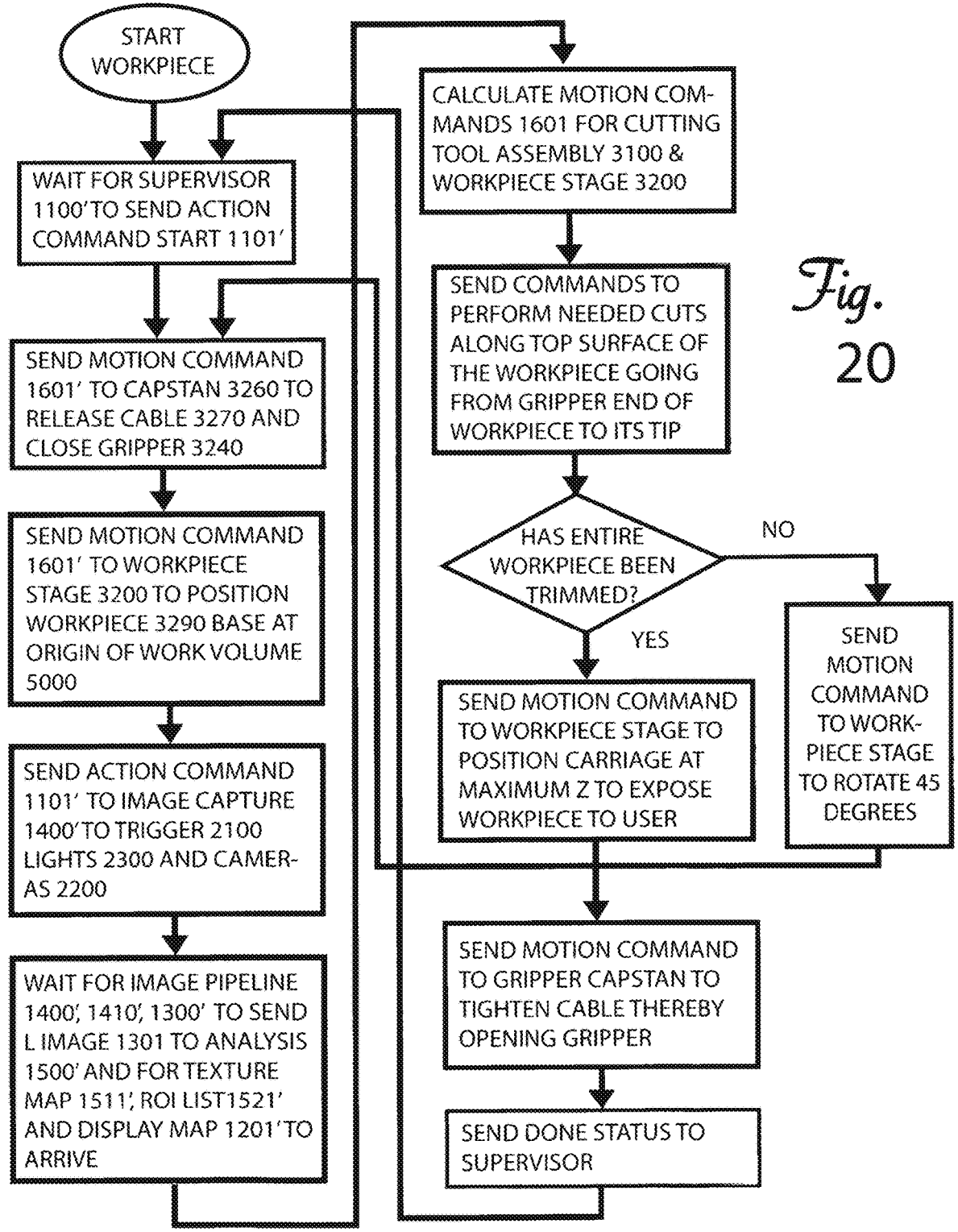
FIG. 20 is a flowchart of a trimming process according to an alternate embodiment of the present invention.
Figure 21:
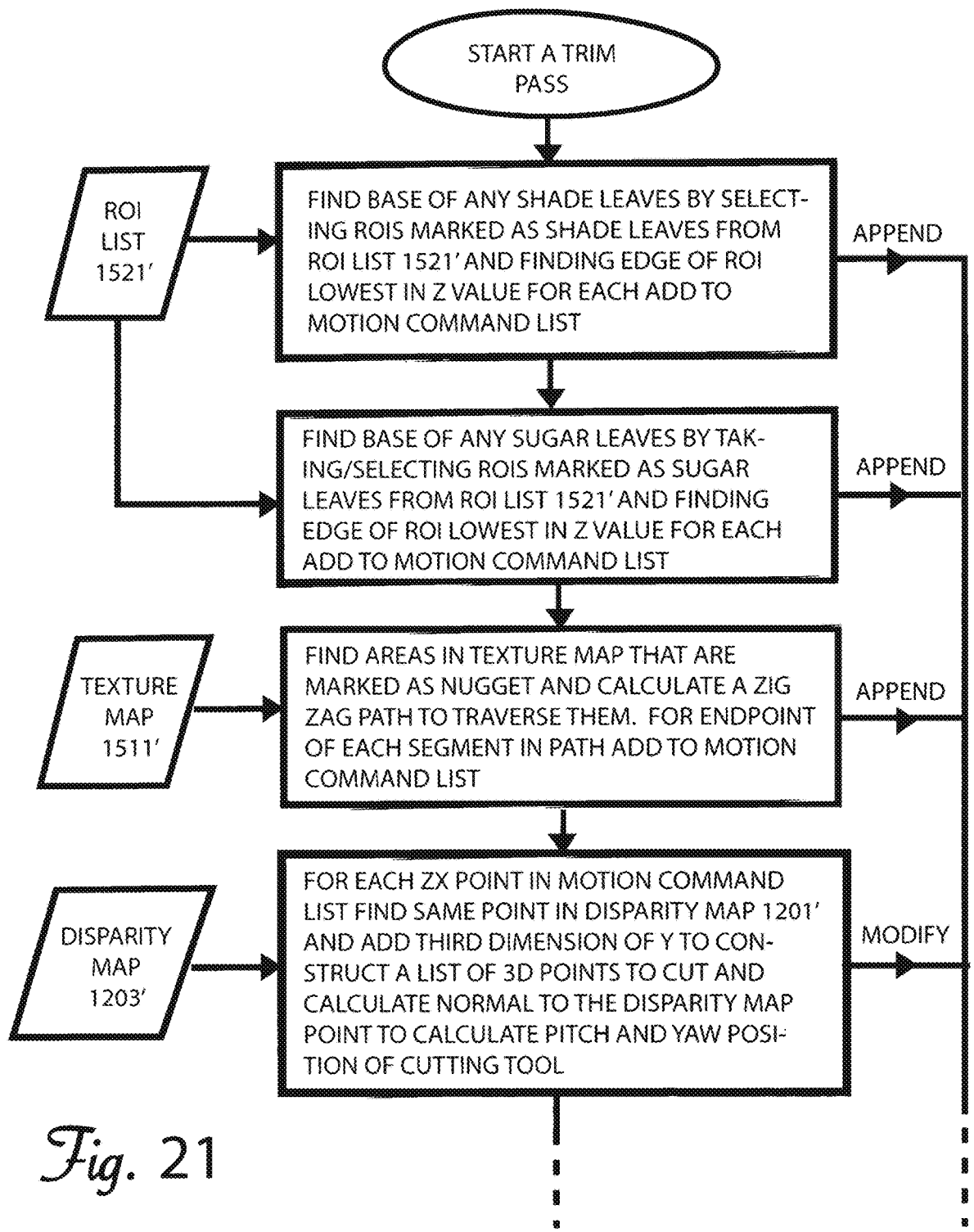
FIG. 21 is a flowchart of path planning and motion command process according to the alternate embodiment of the present invention.
Figure 21:
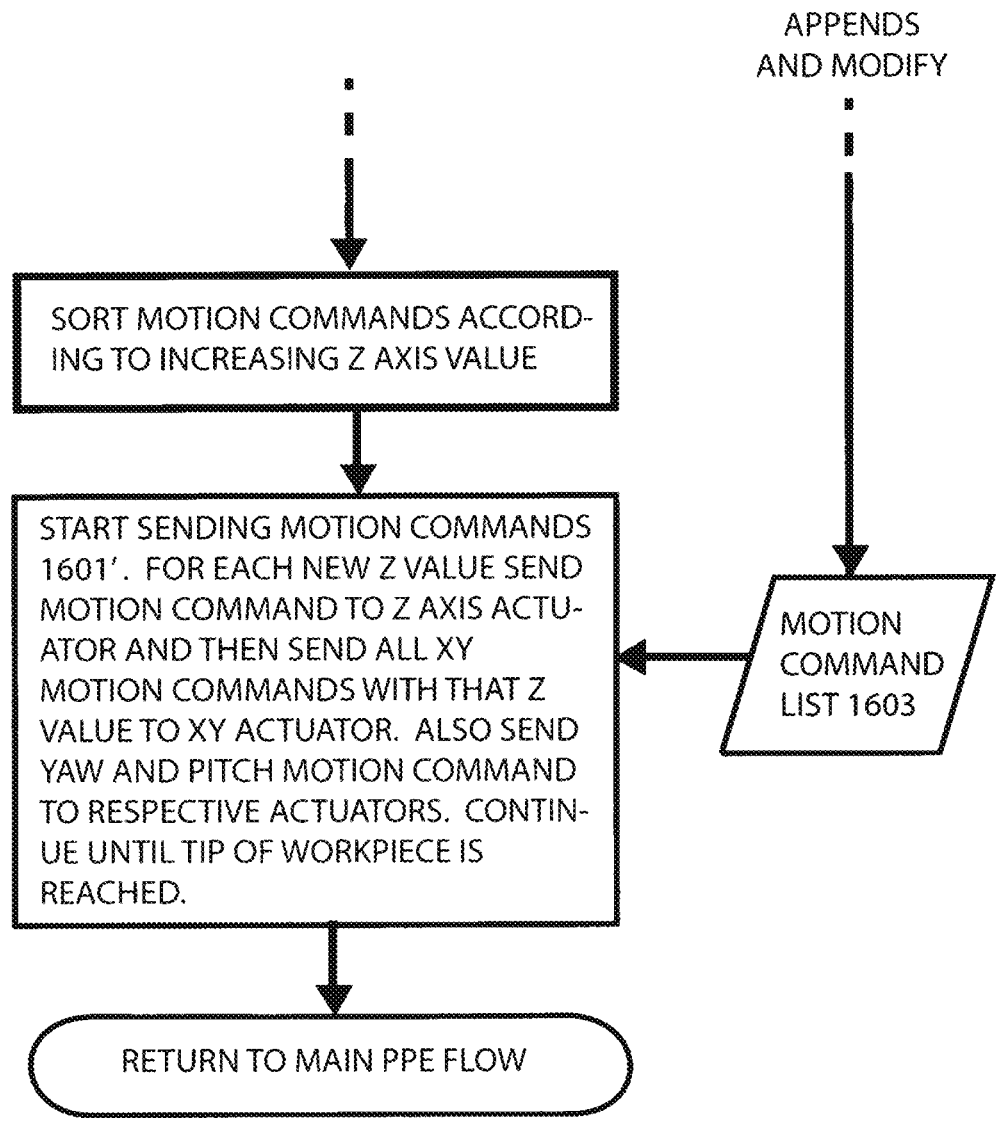
Figure 22A:
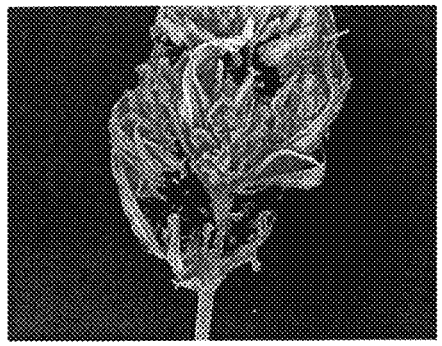
FIGS. 22a through 22f show images of the workpiece at various stages of processing according to the alternate embodiment of the present invention.
Figure 22B:
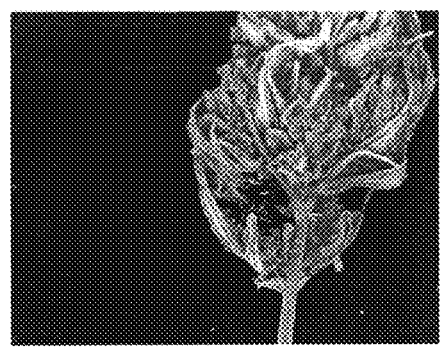
Figure 22C:
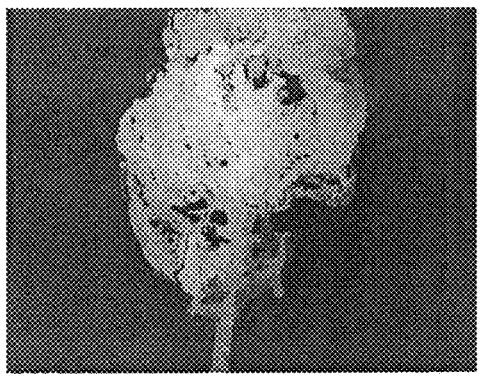
Figure 22D:
Figure 22E:
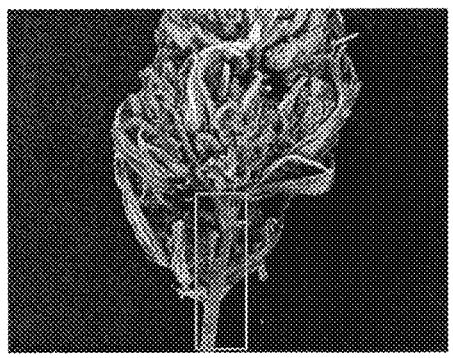
Figure 22F:
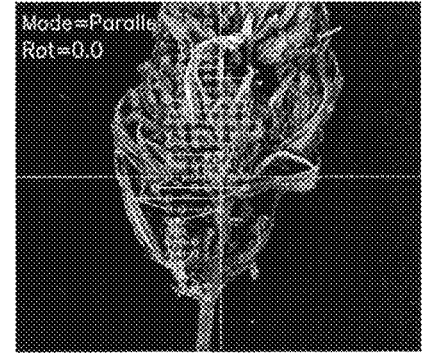

As shown in FIGS. 20 and 21, the path planning & execution unit (1600') combines the texture map (1511') and the ROI list (1521') with the disparity map (1201') to create a 3D model of the surface of the workpiece (3290) visible to the cameras (2210 and 2220) that has information on the types and locations in space of the different parts of the cannabis flower. It then uses a set of heuristics to determine where, how and in what order to move the cutting tool (3100) and workpiece stage (3200) to remove the unwanted portions of the workpiece (3290). It then begins sending motion commands (1610) to the motion system (3000). It repeats this process until the current workpiece (3290) is trimmed at which point it signals the supervisor (1100).

The visual system (2000) produces a pair of images (2001 and 2002) from left and right cameras (2210 and 2220) located above the work volume (5000) when commanded to do so by the control system's supervisor (1100). The cameras (2210 and 2220) are positioned so as to give a pair of overlapping stereo images (2001 and 2002) of the portion of the workpiece (3290) visible in the work volume (5000) that are used by the control system (1000) to produce a 3D model of the currently visible surface of the workpiece (3290). The cameras (2210 and 2220) are controlled externally by the trigger (2100) that also controls the lighting (2300). The lights (2310 and 2320) are strobed with a pulse of <1 ms in order to reduce motion blur to allow for the capture of images of the workpiece (3290) even when it is in motion thereby increasing system speed. This is shown in the simplified side view of the system FIG. 16 and the simplified front view of the system in FIG. 17.

The control system (1000) sends a sync command (1401), via a USB bus, to the trigger (2100) which converts the command into a first electrical signal that turns on a set of High Power LEDs (2310 and 2320) and a subsequent second electrical signal that connects to external triggers the cameras' (2210 and 2220) to instruct the cameras (2210 and 2220) to capture one image each of the L+R images. The trigger (2100) then turns off the LEDs (2310 and 2320) and awaits the next command.

The two cameras (2210 and 2220) capture simultaneous stereo images of the work volume (5000) when triggered by an external signal from the trigger (2100). They are preferably (although alternatives are possible) a pair of Industrial CCD cameras with global shutters which capture all the pixels simultaneously and separate lens (2215 and 2225) that are connected to the control system (1000) via USB 3.0 connections. The cameras (2210 and 2220) capture 24 bit color images of 1280×1024 resolution (2001 and 2002).

The left camera (2210) is aligned along an axis that is perpendicular to the XZ plane of the work volume (5000) and the right camera (2220) is off axis. This arrangement enables the control system's analysis section (1500), which works solely with the left image data, to produce XZ plane information that can be mapped back onto the workpiece's surface without additional geometric processing.

If the cameras are located directly above the work volume (5000) they focus directly on the work volume (5000). Alternatively the cameras (2210 and 2220) may also be located on an optical path that includes one or more mirrors in order to fold the optical path and to make the visual system (2000) more compact.

Each camera (2210 and 2220) has a C/CS mounted lens (2215 and 2225) that has variable focus, iris aperture control, and zoom. The typical zoom is set for 55 mm length with a focus at approximately 600 mm. This places the workpiece (3290) at a distance such that the typical workpiece length of 25-75 mm will fit within the frame and still be close enough to provide sufficient resolution so that workpiece features such as texture can be correctly captured. The aperture is made as small as possible to allow for greater depth of field.

The lighting (2300) is composed of a series of high power (5 W each) LEDs (2310 and 2320) located along-side the work volume (5000) and directed at the workpiece (3290). The LEDs (2310 and 2320) are pulsed by the trigger (2100) during image capture. The pulsing allows for greater brightness and reduces power consumption. They emit visible light spectra for trimming operations and quantitative analysis. Alternatively the LEDs (2310 and 2320) may emit UV light, which causes some contaminants such as powdery mildew (a fungus) to fluoresce visible light so that they may be detected by the cameras (2210 and 2220).

Figure 16:
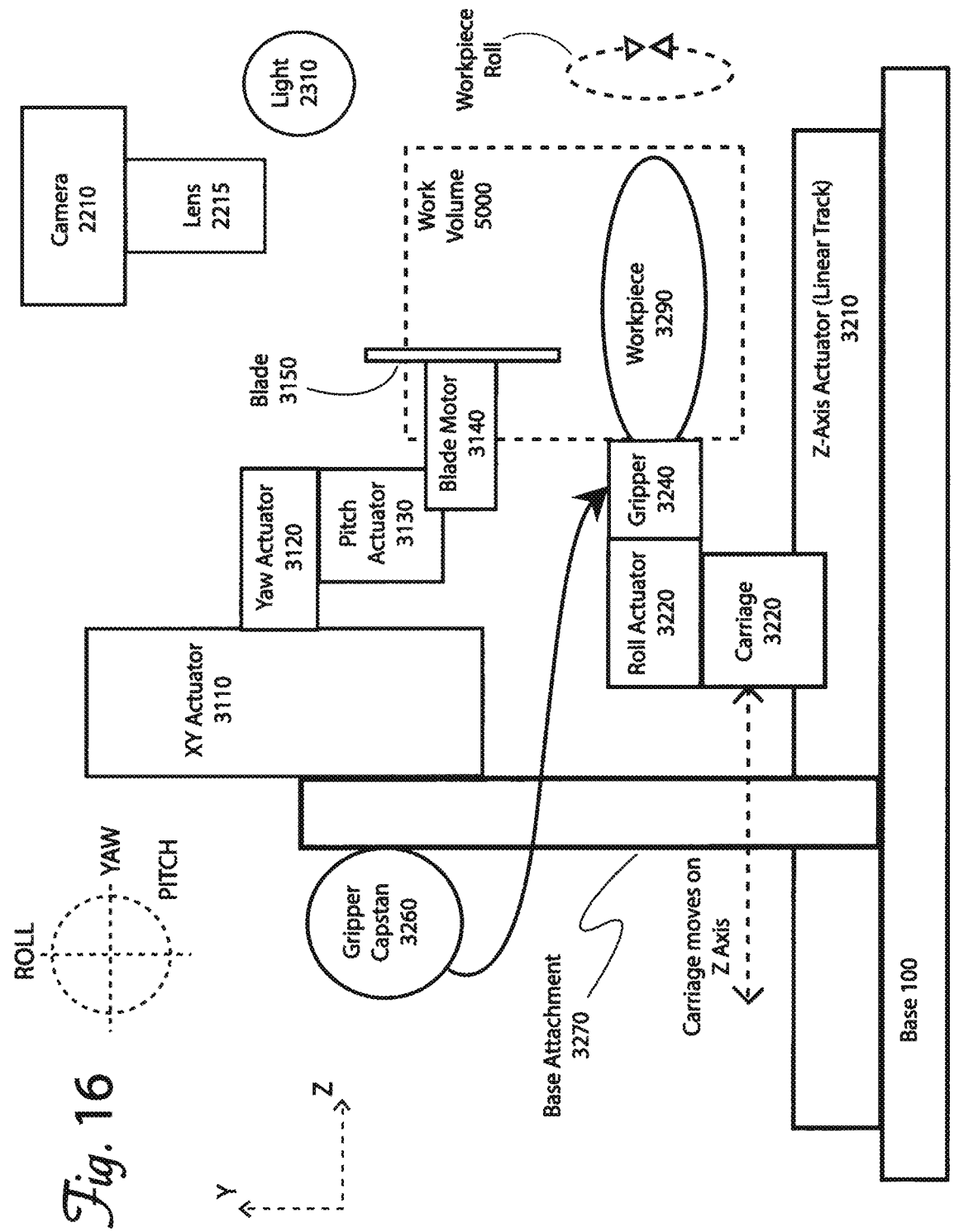
FIG. 16 is a schematic side view of the physical components of the alternate embodiment of the present invention.
Figure 17:
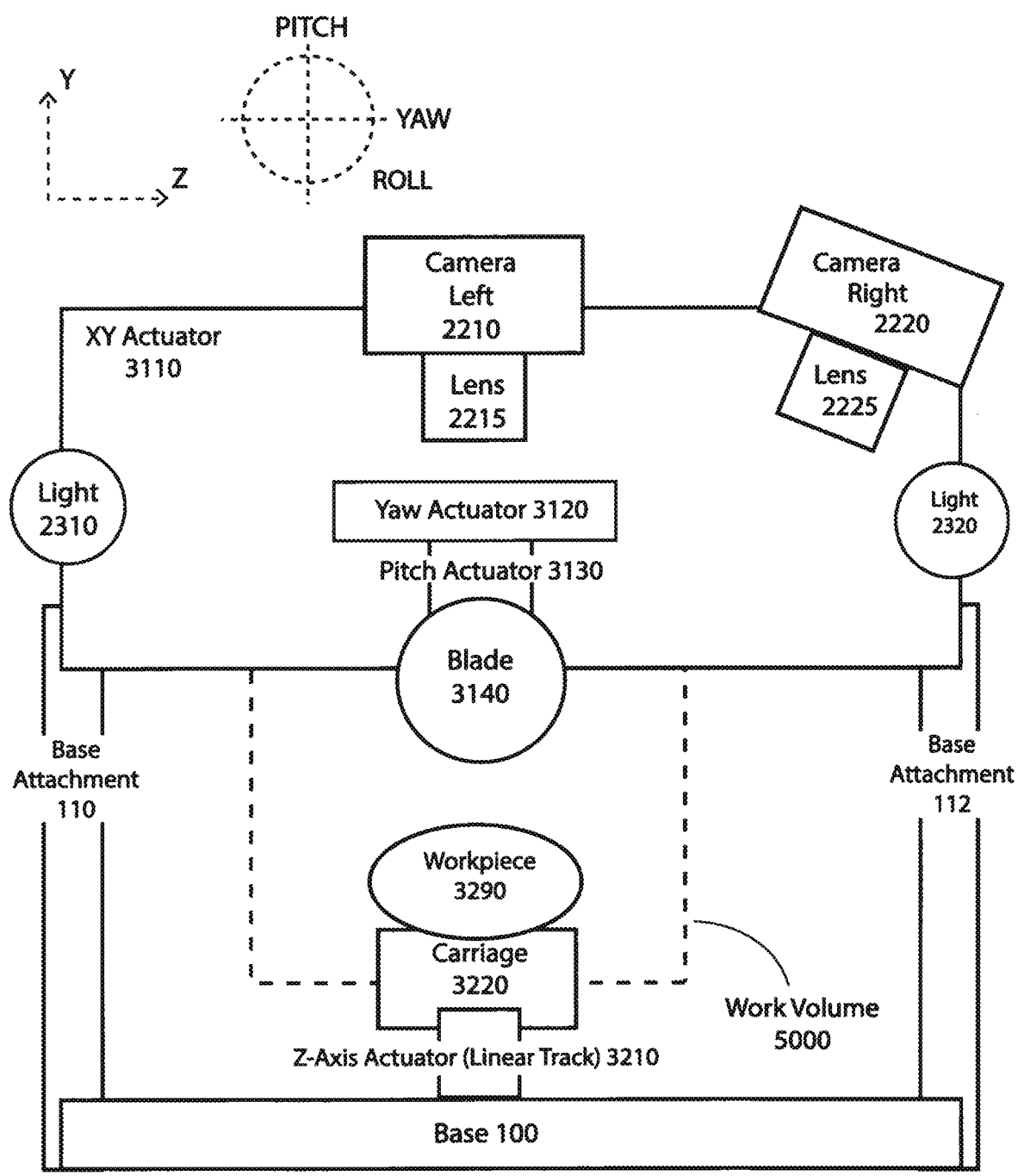
FIG. 17 is a schematic front view of the physical components of the alternate embodiment of the present invention.

As shown in FIGS. 16 and 17, the motion system (3000) is organized as a traditional machine tool with a movable cutting tool assembly (3100) and workpiece stage (3200). It is a 6 degree of freedom (6 DOF) system. With three translation axis (x, y and z) axis and 3 rotations (pitch, roll and yaw). The workpiece stage (3200) translates along the Z axis and rotates in the XY plane, i.e. the roll plane of the workpiece (3290). The cutting tool assembly performs XY translations, pitch and yaw motions of the motor (3140) and the blade (3150).

The cutting tool assembly (3100) moves the motor (3140) and cutting blade (3150) through the work volume (5000) with 2 axes of translation (X and Y) and two of rotation (yaw and pitch).

The xy actuator (3110) translates the attached yaw actuator (3120) vertically (Y-Axis) and horizontally (X-Axis). It is comprised of, but not limited to, a pair of Electro-Magnetic Voice coils mounted at right angles and connected to single point via a parallel linkage that allow said point and the attached Yaw Actuator to be moves independently of each of XY axes. Other implementations include 5-Bar Parallel, Delta and Serial rotation linkages.

The yaw actuator (3120) is a swing arm servo whose body is attached to the xy actuator (3110) and whose arm is attached to the pitch actuator (3130). Its plane of rotation is parallel to the base plate, i.e. in the XZ plane.

The pitch actuator (3130) is also a servo whose body is fixed to the yaw actuator (3120) and whose swing arm is attached to the motor (3140). It provides pitch motion in the YZ plane of the motor (3140) and hence the attached blade (3150).

The motor (3140) is a Brushless DC motor whose stator is mounted to the pitch actuator (3130) and whose rotator is attached to the blade (3150). It may also be implemented by other means such as other types of electrical motors or air drive micro turbines such as those found in dentists' drills.

The blade (3150) is a circular blade, like those found in table saws. The blade (3150) is fixed to the aforementioned motor's (3140) spindle and driven at speeds ranging from 25,000 to 75,000 rpm, more preferably from 40,000 to 60,000 rpm, and still more preferably from 45,000 to 55,000 rpm. Rotation speeds of these magnitudes provide the advantage that centrifugal forces are sufficiently strong to cause resins from the cannabis flower to move away from the axis of rotation. Therefore, the resins do not stick to the surface of the blade and the need for cleaning the blade (3150) is minimized. The teeth of the blade (3150) are asymmetrical and shaped somewhat like a shark's dorsal fin (i.e., having a concave side and a convex side), rather than simple triangular teeth. The direction of rotation of the blade (3150) is such that the concave side of the teeth function as the forward cutting edge, thereby providing the advantage that the teeth scoop the air at the edge of the disk (3150) and when rotated at high speeds cause a low pressure region near the outer edge of the blade (3150) that draws the leaf material of the cannabis flower (workpiece 3290) towards the blade (3150) to aid in the cutting function of the blade (3150). It is believed that the Coanda Effect may play some role in this air pressure effect. The blade (3150) is typically made of laser cut stainless steel but can alternatively be made from other metals by stamping.

The workpiece stage (3200) holds the workpiece (3290) and is movable along the Z Axis and rotatable in the roll plane in order to allow the entire surface of the workpiece (3290) to be accessible to the blade (3150). Because the mobility of the blade (3150) is limited to the work volume (5000) while a workpiece (3290) may have a length greater than the length of the workspace (5000) in the Z direction, the linear track (3210) has a length greater than the length of the workspace (5000) in the Z direction.

Figure 18A:
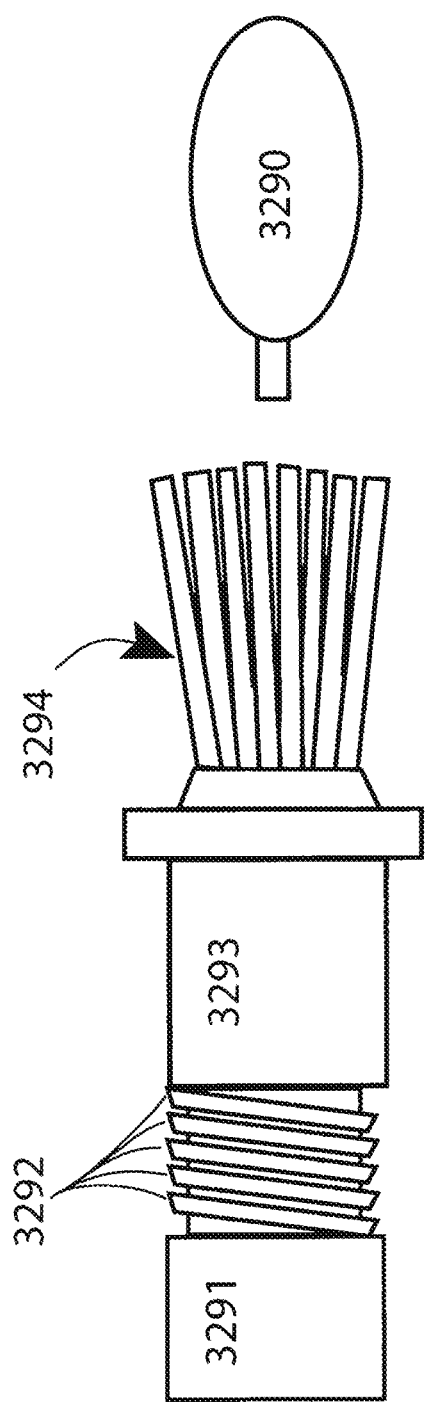
FIG. 18A shows a workpiece gripper according to the present invention in the open position.
Figure 18B:
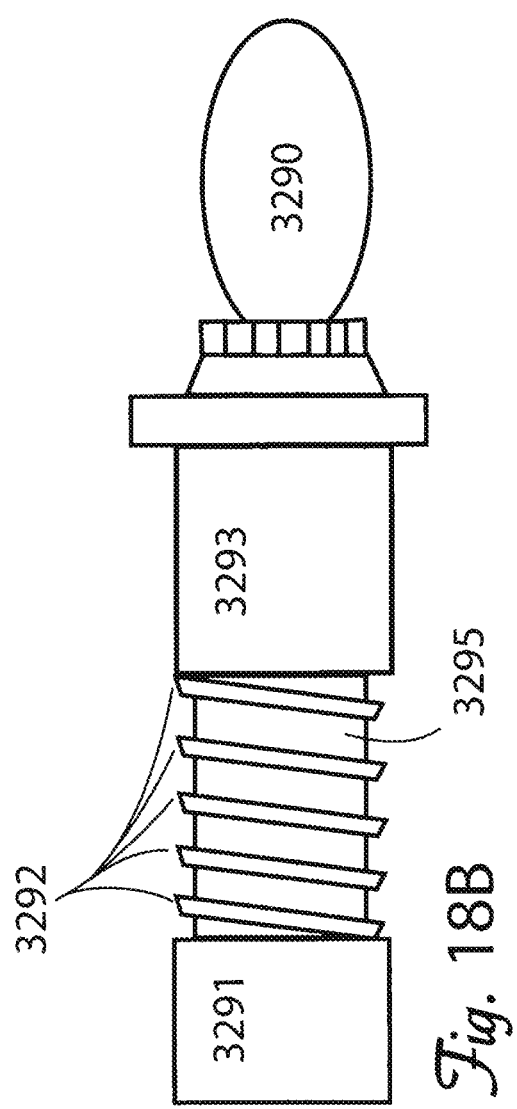
FIG. 18B shows a workpiece gripper according to the present invention in the closed position gripping a workpiece.

As shown in FIGS. 18A and 18B, according to the preferred embodiment of the present invention the gripper (3240) is implemented as a set of parallel hexagon plastic rods (3294) of 2" in length and 0.060" in diameter (3245). The hexagonal shape is used so that when compressed together they are completely space filling which transmits the compression force through out the bundle and grips the material of the workpiece (3290) that present in the gripper with more force that would be applied by other rod shapes such as circular. The hexagon rods attached at the end adjoining the gripper center rod (3244) which is connected to the roll actuator (3230) by the gripper base (3241) and are unrestricted at the other end until a constraining yoke (3243) is pushed along the length of the gripper center rod (3244) from the roll actuator (3230) end to the workpiece (3290) end by a gripper return spring (3292) to force the hexagon rods (3294) together. A workspiece (3290) is mounted in the gripper (3240) for trimming by inserting the stem of the workpiece (3290) into the maw between the rods (3294) when they are in their open state and forcing the rods (3294) together to close on the stem. After the current workpiece (3290) is trimmed and the gripper (3240) is positioned to be accessible to the user (0001), the yoke (3293) is withdrawn by a gripper hook (3271) that is pulled by the gripper cable (3270) which is driven by the gripper capstan (3260) thereby opening the rods (3294) to allow for removal of the current and insertion of the next workpiece (3290).

The gripper assembly (3240) allows for the workpiece stem to enter over a wider area and over a wider range of angles than a simple pincher gripper. This allows for better positioning of the workpiece so as to reduce cutting tool travel and increase trimming speed.

The roll actuator (3230) is a stepper motor whose rotor is attached to the gripper (3240) and whose stator body is attached to the Z axis actuator (3210) via its carriage (3220). The rotation of the rotor rotates the gripper (3240) and the attached workpiece (3290) about the Z Axis.

The Z axis actuator (3210) utilizes a stepper motor with an attached pulley to drive a toothed belt attached to a wheeled carriage (3220) to move the wheeled carriage (3220) length wise along a guide rail (3210). This moves the workpiece (3290) along the Z Axis, including throughta region within the work volume (5000).

Figure 19:
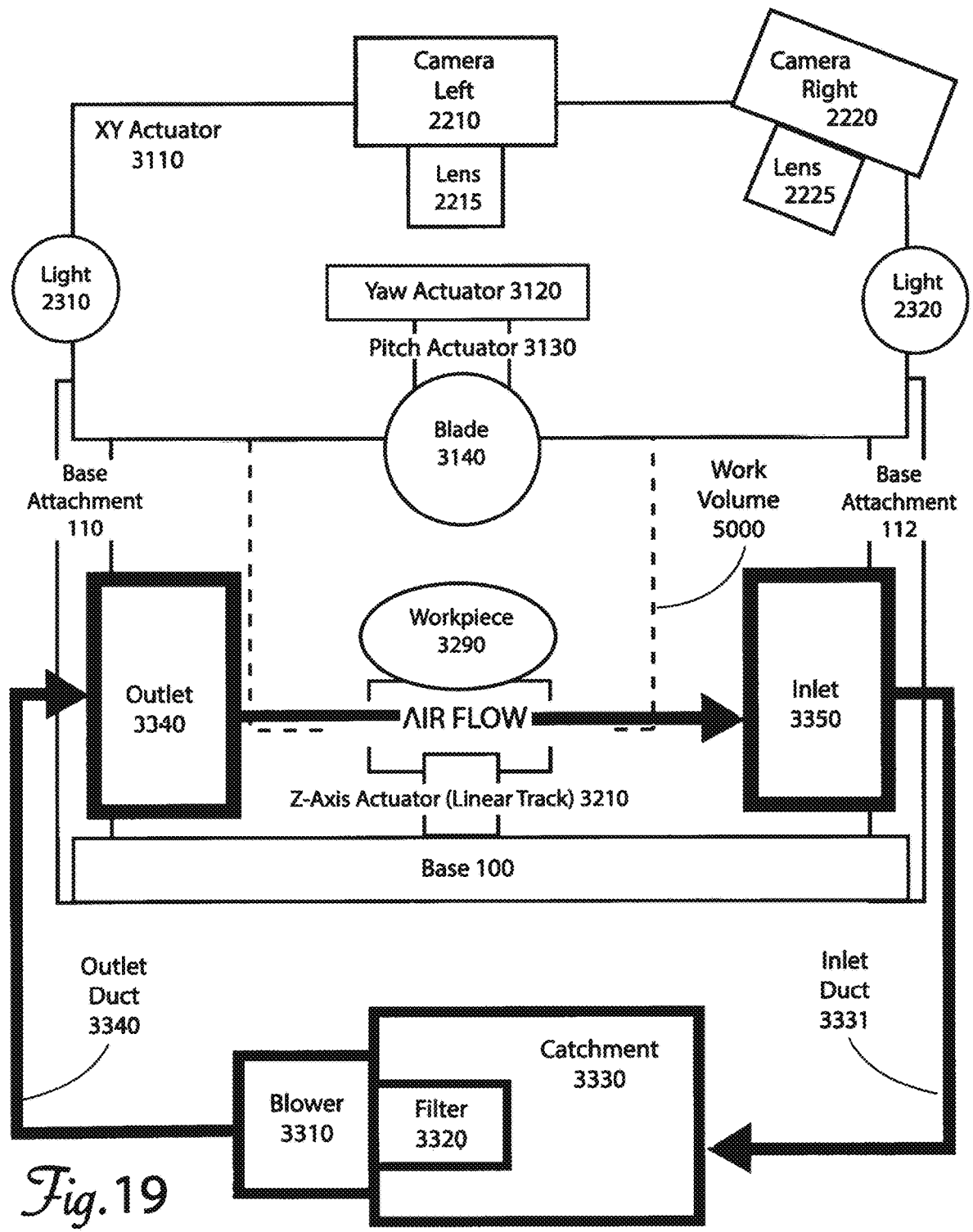
FIG. 19 shows a cuttings collection system according to the present invention.

As shown in FIG. 19, the cuttings collection system (3300) blows air cross wise in the XY plane for the purpose of collecting material cut from the workpiece (3290) by the blade (3150). This reduces the debris in the work volume (5000). Additional processes not described herin may be applied to extract additional plant components. The cuttings collection system (3300) is composed of a centrifugal blower (3310) driven by a electrical motor. The output of the blower (3310) is directed to the work volume by a ducting system (3311). The inlet (3350) to the duct system (3331) is located on the opposite side of the workpiece (3290) from the outlet (3340). The input (3350) to the inlet (3350) therefore includes debris. This inflow is directed though a catchment (3330) and air filter (3320) before again passing through the blower (3311).

An Alternative Motion System

Figure 25:
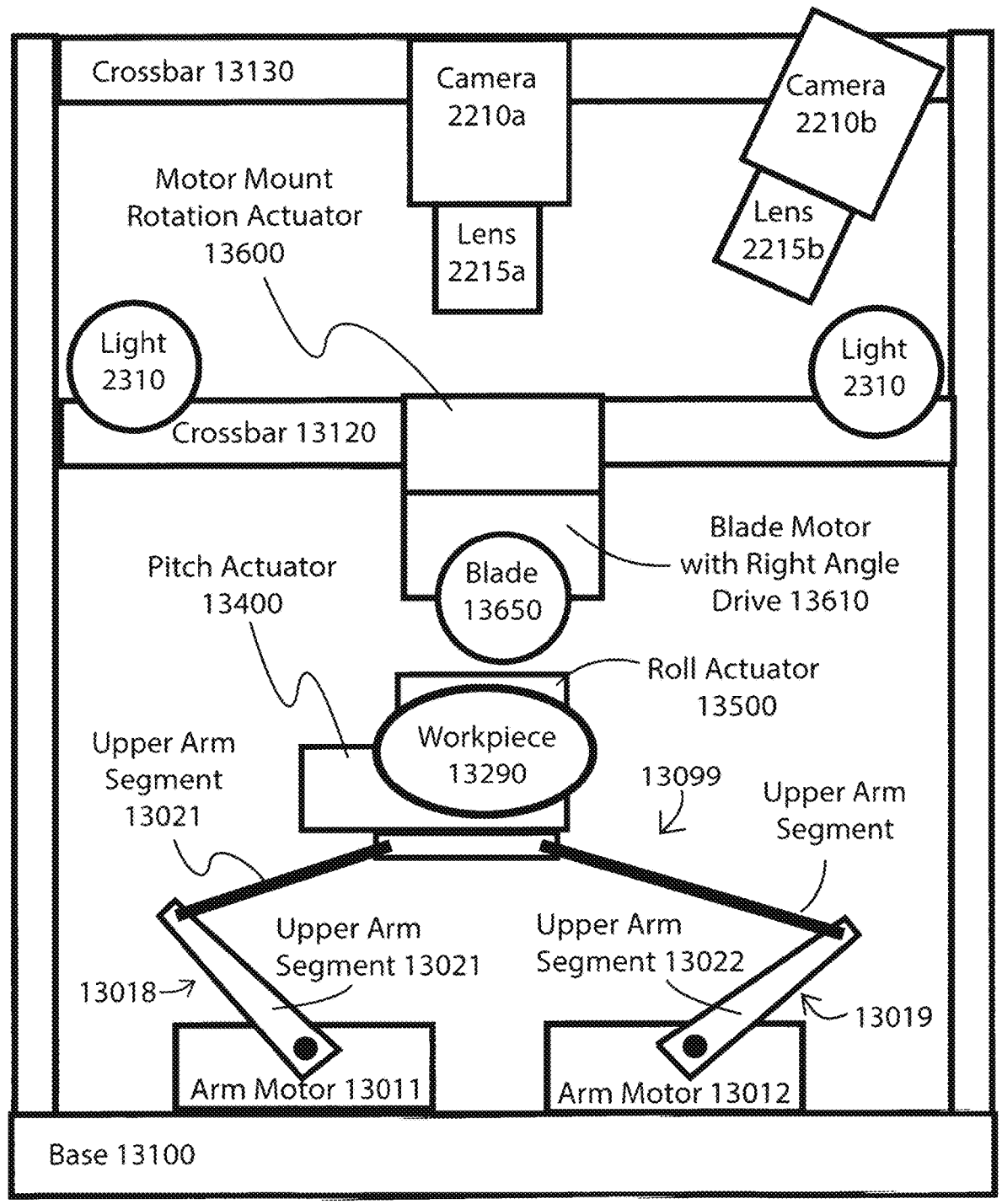
FIG. 25 is a schematic front view of the physical components of an alternate embodiment of the present invention where the motion system utilizes a parallel-arm robot.

FIG. 25 shows an alternate preferred embodiment (13000) of the present invention which includes a vision system having an on-axis camera (2210a) and on-axis lens (2215a) and an off-axis camera (2210a) and lens (2215a) mounted on an upper crossbar (13130), a cutting blade (13650) driven by a blade motor (13610) mounted on a middle crossbar (13120), and a workpiece manipulation system which utilizes a three-armed or four-armed parallel robot (13099) mounted on the base (13100) of the system. Also mounted on the middle crossbar (13120) are lights (2310). Mounted extending vertically upwards from the base (13100) are base attachment bars (13110) to which crossbars (13120) and (13130) are affixed. As is well-known in the art of "pick and place" technology for providing three-dimensional translation of objects, parallel robots use multiple computer-controlled parallel chains to control the position of a platform. Three-armed parallel robots are commonly referred to as deltas, and four-armed parallel robots are commonly referred to as quads. The vision system (2210a), (2215a), (2210b), and (2215b) may use features of one of the vision systems described above or may be some hybrid including features from one or both of the vision systems described above. Similarly, the digital signal processing and control utilized with the embodiment depicted in FIG. 10 may use features of one of the processing and control systems described above or may be some hybrid including features from one or both of the processing and control systems described above.

As shown in FIG. 25, the parallel robot (13099) has a first arm 13018 and a second arm 13019 extending upwards from the bass (13100). (It is to be understood that although depicted with only two arms for simplicity of schematic depiction, the parallel robot of the present invention includes more than two arms.) It should be noted that the left arm (13021) has an upper arm segment (13021) and a lower arm segment (13031), and the right arm (13022) has an upper arm segment (13022) and a lower arm segment (13032), where the upper arm segments (13021) and (13022) are located below their respective lower arm segments (13031) and (13032). In the present specification the arms are named in this unconventional way to highlight that parallel-arm robots are generally used in an orientation inverted from the orientation shown in FIG. 10, i.e., the base of parallel-arm robots is standardly located at the top of the system with the arms extending downwards. The orientations of the upper arm segments (13021) and (13022) are controlled by arm motors (13011) and (13012). Having the vision system (2210*a*), (2215*a*), (2210*b*), (2215*b*) located above the workpiece (13290) allows (i) a view of the workpiece (13290) which is unobstructed by the parallel-arm robot (13099), (ii) trimmings from the workpiece (13290) to fall in a direction away from the vision system (2210*a*), (2215*a*), (2210*b*), (2215*b*) so as not to dirty the lens (2215*a*) and (2215*b*), and (iii) the vision system (2210*a*), (2215*a*), (2210*b*), (2215*b*) to be stationary so that the positions and relative positioning of the lenses (2215*a*) and (2215*b*) may be accurately known, thereby minimizing error in the determination of locations where pruning operations are to be performed.

Attached at the upper ends of the lower arm segments (13031) and (13032) is a platform (13040) upon which is mounted a pitch actuator (13400) and a roll actuator (13500). The orientations of the upper arm segments (13021) and (13022) determine the location of the platform (13040), the pitch actuator (13400) controls the pitch of the workpiece (13290) relative to the platform (13040), and the roll actuator (13500) controls the roll of the workpiece (13290) relative to the platform (13040). Therefore, this system provides five degrees of freedom of motion to the workpiece (13290)—three degrees of translation motion is provided by the parallel-arm robot (13099) and two degrees of rotational motion is provided by the pitch actuator (13400) and roll actuator (13500).

It should be noted that the workpiece (13290) is assumed to have an elongated shape and the system shown in FIG. 25 is designed for a workpiece (13290) whose shape is roughly circumscribed by a somewhat elongated ellipsoid or a cylinder. Although the workpiece (13290) is shown with its longitudinal axis being horizontal and the blade (13650) is depicted with its axis of rotation pointing out from the page in the schematic depiction of FIG. 25, it should also be noted that when the workpiece (13290) is oriented with a pitch of 0°, the longitudinal axis of the workpiece (13290) is roughly parallel to the axis of rotation of the blade (13650). It should be further noted that according to the present invention no mechanism is provided for control of the yaw of the workpiece (13290) although including a yaw actuator would provide the advantage of allowing greater control of the orientation of the workpiece (13290) relative to the blade (13650).

The advantage of not including a yaw actuator between the platform (13040) and the workpiece (13290) is that the speed with which the parallel-arm robot (13099) can move is inversely related to the weight of the platform (13040) plus whatever assembly is mounted on the platform (13040), so minimizing the number of mechanisms on the platform (13040) increases the speed with which the motion system can function. Because the vision system (2210*a*), (2215*a*), (2210*b*), (2215*b*) is mounted in a fixed position at the top of the system, the pitch actuator (13400) and the roll actuator (13500) are mounted on the platform (13040). Considering the workpiece (13290) as essentially cylindrical for the sake of discussion, most of the trimming operations are required on the side surfaces of the workpiece (13290). On the side surfaces the viewing and cutting can be accomplished with the workpiece at a pitch of 0° or near 0°, so the majority of the movement of the workpiece (13290) during trimming of the side surfaces is implemented by the parallel-arm robot (13099) and the roll actuator (13500). However, trimming at the top and bottom ends of the workpiece (13290) requires that the workpiece (13290) be pitched at a greater degree to be properly viewed by the vision system (2210*a*), (2215*a*), (2210*b*), (2215*b*) (i.e., viewed at a fairly non-oblique angle) and properly accessed by the blade (13650), so the pitch actuator pitch actuator (13400) is more active during those portions of the process.

In the schematic shown in FIG. 25, the blade (13650) is mounted to the crossbar (13120) via a right angle drive (13610). The right angle drive (13610) is in turn connected to the motor mount rotation actuator (13600) which provides the sixth degree of freedom of motion, i.e., the yaw degree of freedom, between the blade (13650) and the workpiece (13290). By driving the blade (13650) with a right angle drive (13610) (rather than a standard drive which would be located directly behind the blade (13650)), the depth of the assembly behind the blade (13650) to be lessened, and this permits the blade (13650) to go into narrow crevices in the workpiece (13290). As noted above, a mechanism for providing the yaw degree of freedom is not mounted on the platform (13040) because that minimizes the weight on the platform (13040) and providing the yaw degree of freedom of the workpiece (13290) relative to the vision system (2210*a*), (2215*a*), (2210*b*), (2215*b*) is not necessary. It should be noted that in an alternate embodiment of the present invention, the blade (13650) is mounted directly to the crossbar (13120) and no yaw degree of freedom is provided between the blade (13650) and the workpiece (13290) since there is fairly wide latitude in the yaw degree of freedom necessary for the blade (13650) to provide the required cutting operations.

Thus, it will be seen that the improvements presented herein are consistent with the objects of the invention described above. While the above description contains many specificities, these should not be construed as limitations on the scope of the invention, but rather as exemplifications of preferred embodiments thereof. Many other variations are within the scope of the present invention. For instance: the neural network may include pooling layers; the texture may be categorized into more than just two categories (e.g., smooth and non-smooth)—for instance, a third category of intermediate smoothness may be utilized; a grabbing tool may be substituted for the cutting tool if the apparatus is to be used for harvesting; the apparatus may have a grabbing tool in addition to the pruning tool; there may be more than one pruning tool or more than grabbing tool; there may be a deposit bin for harvested foliage; the apparatus may be mobile so as to enable pruning, harvesting, spraying, or other operations in orchards or fields; the lighting need not be connected to the electric controller and may instead by controlled manually; the lighting may be a form of broad-spectrum illumination; the cutting tool need not be a scissor and, for instance, may instead be a saw or a rotary blade; the scissor may be more generally a scissor-type tool; the workpiece positioner may also pivot the workpiece by rotations tranverse to what is roughly the longitudinal axis of the target; the texture length scale may be based on other characteristics of the foliage, such as the length scale of veins or insects; neither stereo camera may be oriented with its center of viewing along the y axis—for instance, both stereo cameras may be equally offset from having their centers of viewing along they axis; distance ranging may be performed using time-of-flight measurements, such as with radiation from a laser as per the Joule™ ranging device manufactured by Intel Corporation of Santa Clara, Calif.; viewing of electromagnetic frequencies outside the human visual range, such as into the infra-red or ultra-violet, may be used; the workpiece may not be illuminated with white light; the workpiece may be illuminated with LEDs providing only two frequencies of light; a color image, rather than a grey-scale image, may be sent to the neural network; a spring mechanism need not have a helical shape; the neural network may be training with and/or utilize stereoscopic image data; the error rate at which the neural network is considered to have converged may be greater than or less than what is specified above; etc. Accordingly, it is intended that the scope of the invention be determined not by the embodiments illustrated or the physical analyses motivating the illustrated embodiments, but rather by the claims to be included in a non-provisional application based on the present provisional application and the claims' legal equivalents.

What is claimed is:

1. An automated cutting tool for cutting a resinous plant, comprising:
    a stereoscopic imaging system for imaging said resinous plant to produce a stereoscopic image of said resinous plant;
    a processing system for processing said stereoscopic image to determine a target pruning area;
    a rotatable circular cutting blade having teeth, each tooth having, according to a direction of rotation of the cutting blade, a concave forward cutting edge, rotation of the blade producing a low pressure region near the blade; and
    a control system for locating said cutting blade to perform pruning of said target pruning area.

2. An automated cutting tool for cutting a resinous plant, comprising:
    a stereoscopic imaging system for imaging said resinous plant to produce a stereoscopic image of said resinous plant;
    a processing system for processing said stereoscopic image to determine a target pruning area;
    a rotatable circular cutting blade;
    a motor for rotating said blade at between 25,000 and 75,000 rpm;
    a control system for locating said cutting blade to perform pruning of said target pruning area.

3. The automated cutting tool of claim 2 wherein said motor rotates said blade at between 40,000 and 60,000 rpm.

4. An apparatus for pruning a foliage workpiece comprising:
    a stereoscopic viewing system for viewing of said foliage workpiece,
    a workpiece holder for holding said workpiece,
    a cutting tool for pruning target portions from said foliage workpiece,
    a motion system for controlling the position and orientation of said foliage workpiece held in said workpiece holder in relation to said stereoscopic viewing system and said cutting tool, said motion system including a translation system for three-dimensional translation of said foliage workpiece, a pitch actuator for pitch orientation of said foliage workpiece, and a roll actuator for roll orientation of said foliage workpiece,
    a processing system for processing image data of said foliage workpiece obtained by said stereoscopic viewing system to generate control data for controlling said motion system, said stereoscopic viewing system being located above said workpiece holder.

5. The apparatus of claim 4 wherein said translation system includes a parallel-arm robot.

6. The apparatus of claim 5 wherein said parallel-arm robot provides three-dimensional translation of said pitch actuator and said roll actuator.

7. The apparatus of claim 5 further including a chassis, said stereoscopic viewing system being affixed to said chassis above said workpiece, said motion system and said cutting tool being mounted on said chassis, said cutting tool being located above said workpiece, and a base of said parallel-arm robot being located below said workpiece.

8. The apparatus of claim 4 further including a chassis, said stereoscopic viewing system and said cutting tool being being affixed to said chassis such that trimmings from said workpiece produced by said cutting tool fall in a direction away from said viewing system so as not to obstruct a view of said workpiece by said stereoscopic viewing system.

9. The apparatus of claim 4 further including a chassis, said stereoscopic viewing system being affixed to said chassis above said workpiece, said motion system being mounted on said chassis below said workpiece, and said cutting tool being mounted on said chassis above said workpiece.

* * * * *